(12) United States Patent
Nakai et al.

(10) Patent No.: US 8,411,307 B2
(45) Date of Patent: Apr. 2, 2013

(54) IMAGE PROCESSING DEVICE AND IMAGE FORMING DEVICE

(75) Inventors: Yoshiyuki Nakai, Osaka (JP); Koichi Sumida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 360 days.

(21) Appl. No.: 12/659,846

(22) Filed: Mar. 23, 2010

(65) Prior Publication Data
US 2010/0245898 A1 Sep. 30, 2010

(30) Foreign Application Priority Data

Mar. 24, 2009 (JP) ................................ 2009-072600

(51) Int. Cl.
*G06F 3/12* (2006.01)
(52) U.S. Cl. ...................................... 358/1.15; 358/462
(58) Field of Classification Search .............. 358/1.15, 358/462; 382/299; 399/366
See application file for complete search history.

(56) References Cited

U.S. PATENT DOCUMENTS

| | | | |
|---|---|---|---|
| 5,796,869 | A | 8/1998 | Tsuji et al. |
| 2003/0099394 | A1 | 5/2003 | Shimazawa |
| 2005/0041263 | A1 | 2/2005 | Ishikawa et al. |
| 2005/0151989 | A1 | 7/2005 | Shimura et al. |
| 2006/0109521 | A1* | 5/2006 | Shimazawa .................... 358/462 |
| 2007/0025787 | A1* | 2/2007 | Harada ......................... 399/366 |
| 2007/0053614 | A1* | 3/2007 | Mori et al. ..................... 382/299 |

FOREIGN PATENT DOCUMENTS

| | | |
|---|---|---|
| JP | 05-85158 | 11/1993 |
| JP | 06-178098 | 6/1994 |
| JP | 10-126614 A | 5/1998 |
| JP | 10-150542 A | 6/1998 |
| JP | 2000-134465 A | 5/2000 |
| JP | 2003-051928 A | 2/2003 |
| JP | 2003-99788 A | 4/2003 |
| JP | 2005-142918 | 6/2005 |
| JP | 2005-160016 | 6/2005 |

* cited by examiner

*Primary Examiner* — Marivelisse Santiago Cordero
*Assistant Examiner* — Moustapha Diaby
(74) *Attorney, Agent, or Firm* — Edwards Wildman Palmer LLP; David G. Conlin; David A. Tucker

(57) ABSTRACT

When an image based on RGB image data accepted by the image processing section and the ICU is to be enlarged by the zoom process section of the ICU (or when specification of an area in an image is accepted by the operation section), the leak-preventing identification mark detecting section, the positional relation calculating section and the forgery-preventing identification mark detecting section respectively determine whether patterns respectively representing a leak-preventing identification mark and a forgery-preventing identification mark are included separately in the entire area of the image and in an area to be enlarged (or an area whose specification has been accepted) or not.

3 Claims, 27 Drawing Sheets

FIG. 10

| | FIRST LINE 61 | SECOND LINE 62 | THIRD LINE 63 | FOURTH LINE 64 | FIFTH LINE 65 | SIXTH LINE 66 |
|---|---|---|---|---|---|---|
| FIRST AREA | 9≦BLACK PIXELS | BLACK≦1 PIXELS | BLACK≦1 PIXELS | BLACK≦1 PIXELS | BLACK≦1 PIXELS | BLACK≦1 PIXELS |
| SECOND AREA | BLACK≦2 PIXELS | 3≦BLACK PIXELS | 3≦BLACK PIXELS | 1≦BLACK PIXELS | 2≦BLACK PIXELS | 1≦BLACK PIXELS |
| THIRD AREA | BLACK≦1 PIXELS | BLACK≦1 PIXELS | BLACK≦1 PIXELS | BLACK≦1 PIXELS | BLACK≦1 PIXELS | BLACK≦1 PIXELS |

|  | RANGE OF BLACK PIXELS |
|---|---|
|  | ARC DETECTION |
| FIRST SPLIT AREA | 246≦BLACK PIXELS≦300 |
| SECOND SPLIT AREA | 250≦BLACK PIXELS≦302 |
| THIRD SPLIT AREA | 266≦BLACK PIXELS≦310 |
| FOURTH SPLIT AREA | 480≦BLACK PIXELS |

FIG. 15A PERIPHERAL WHITE JUDGMENT AREA 90a
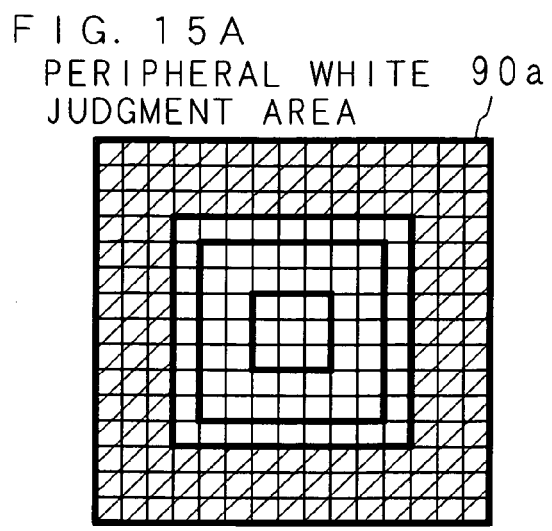
FIG. 15B PERIPHERAL COUNT AREA 90b
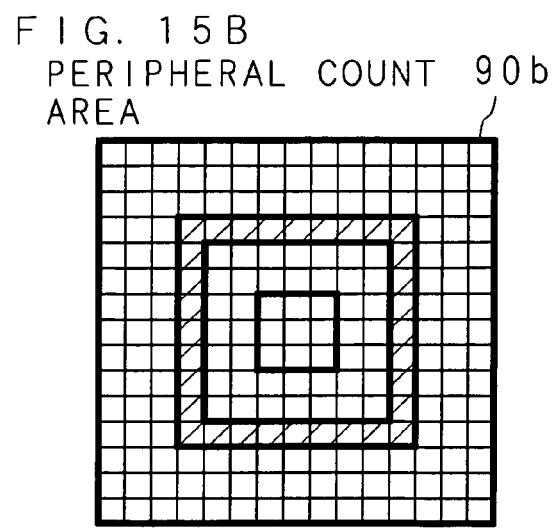
FIG. 15C FIRST CENTRAL COUNT AREA 90c
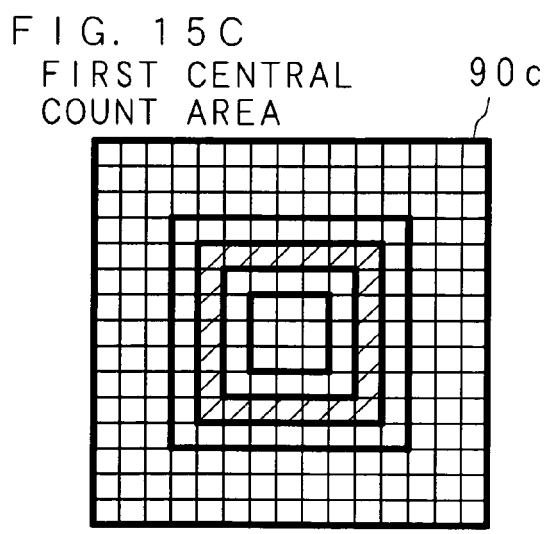
FIG. 15D SECOND CENTRAL COUNT AREA 90d
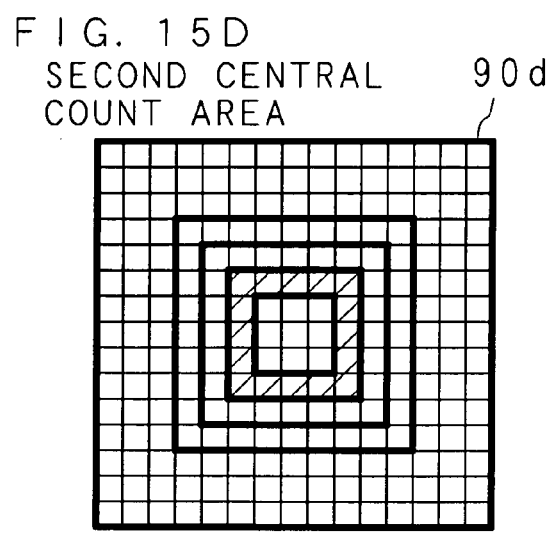
FIG. 15E THIRD CENTRAL COUNT AREA 90e
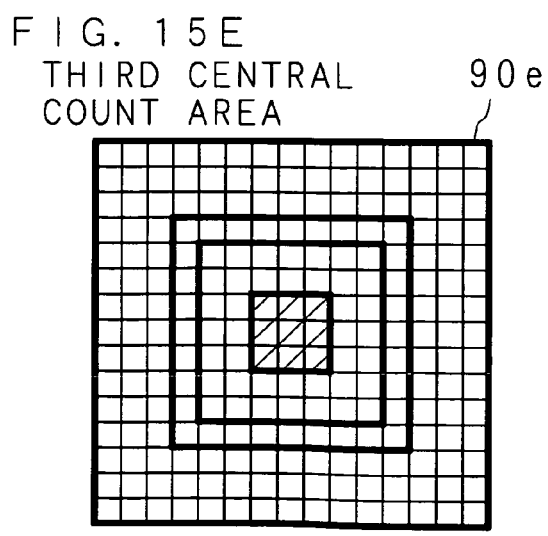

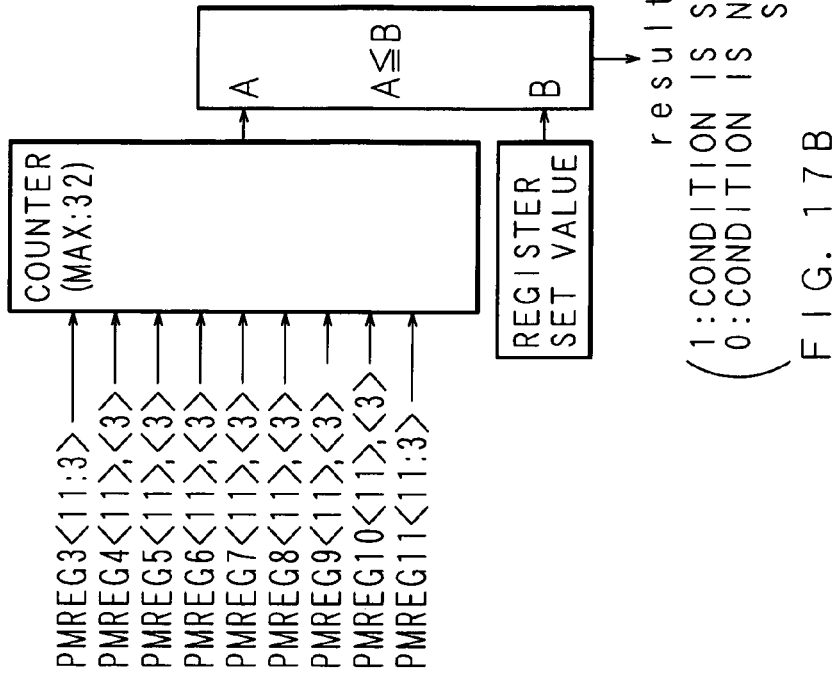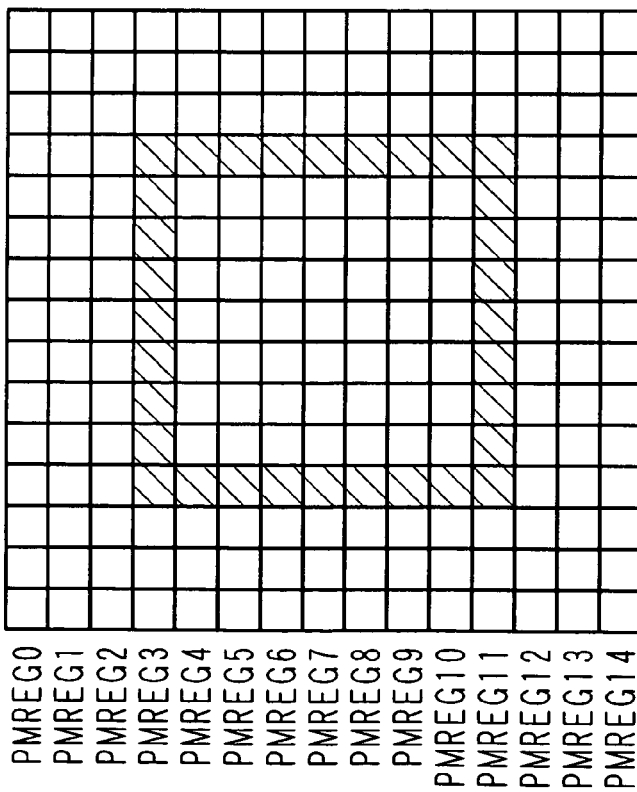
FIG. 17B
FIG. 17A

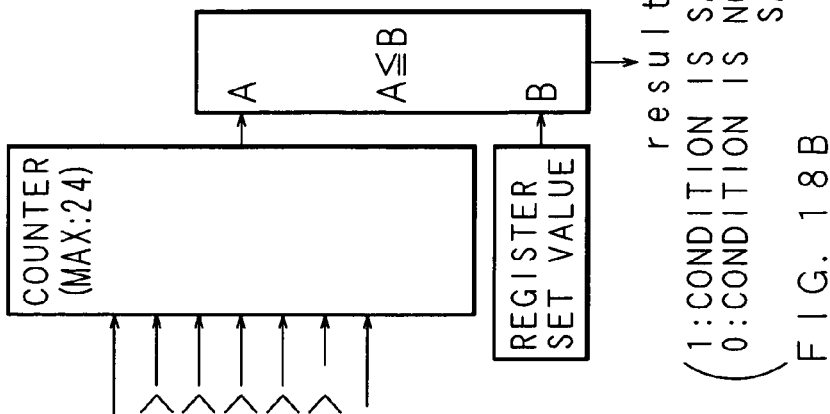
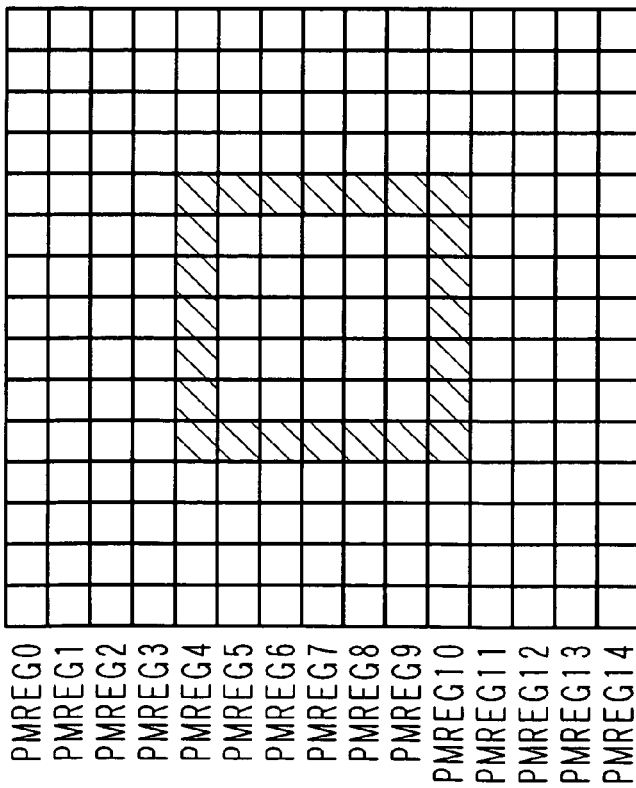
FIG. 18A
FIG. 18B

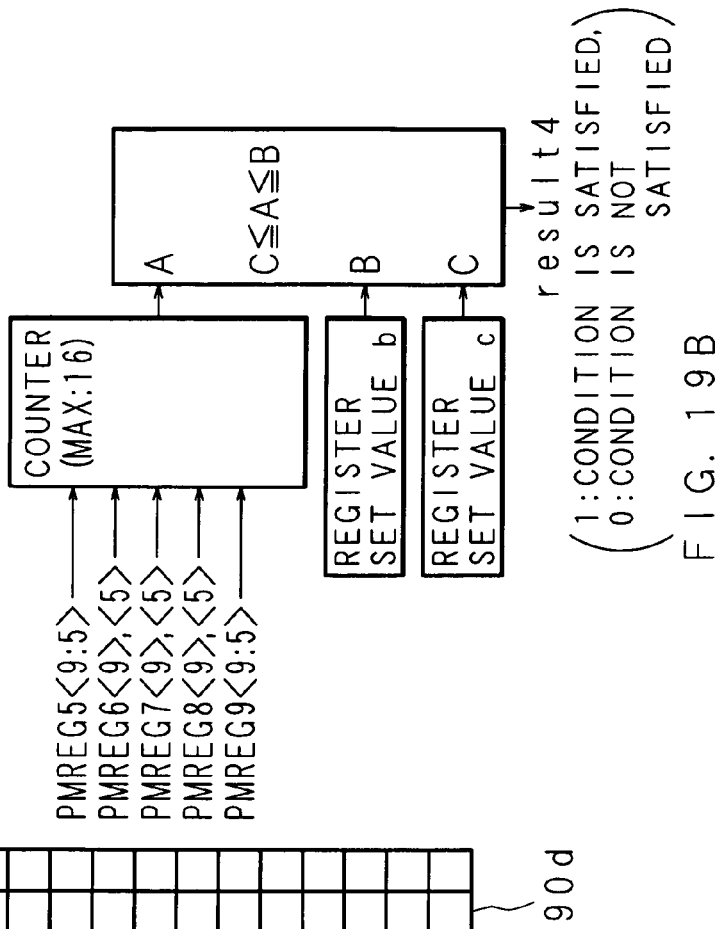
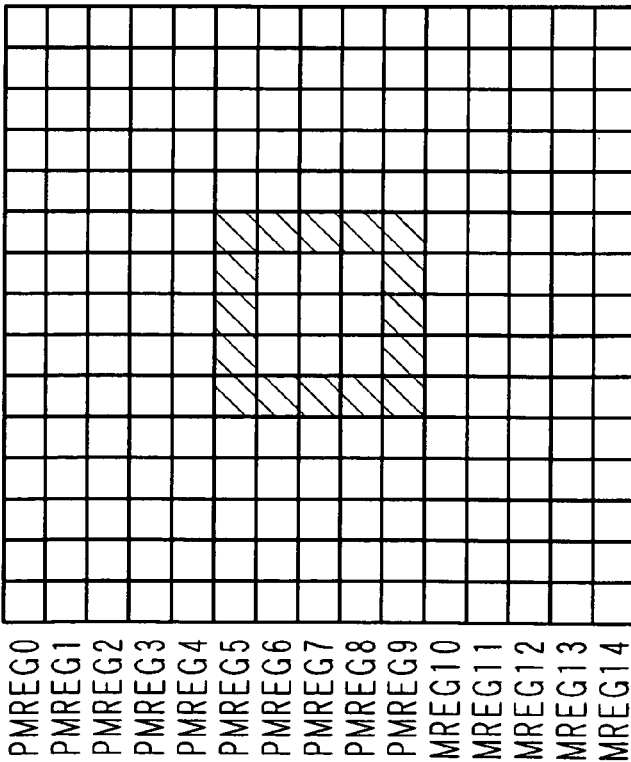
FIG. 19A
FIG. 19B

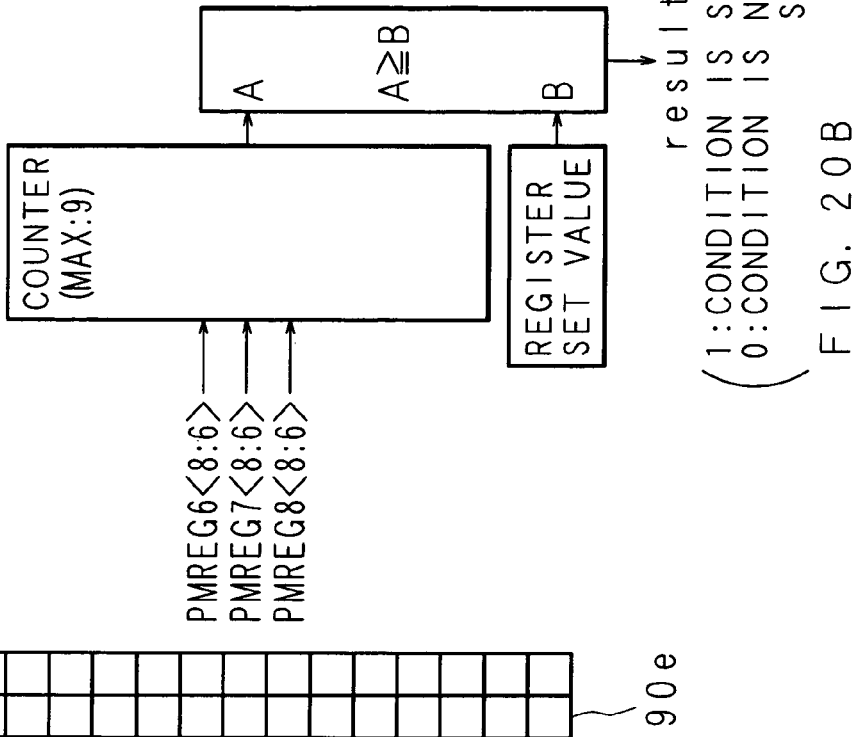
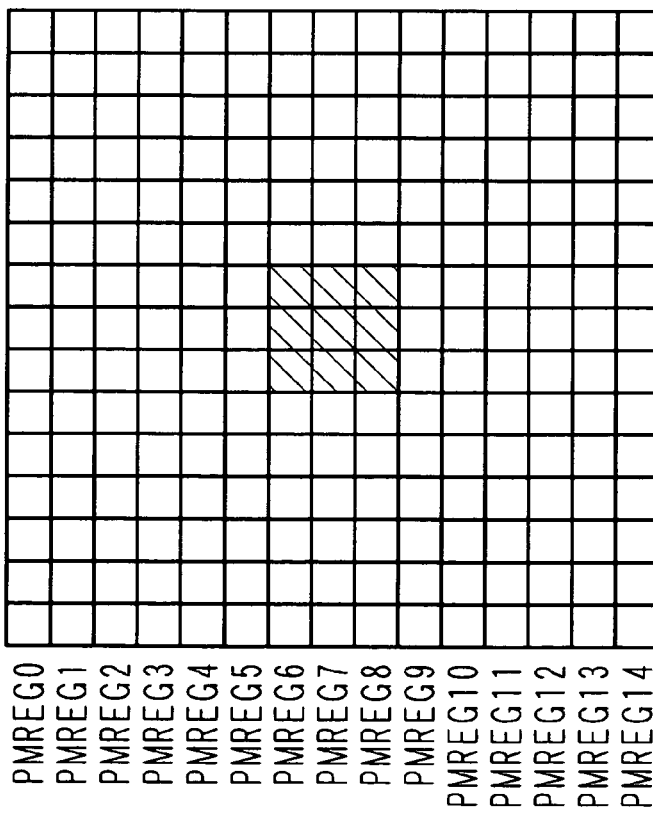
FIG. 20B
FIG. 20A

IMAGE PROCESSING DEVICE AND IMAGE FORMING DEVICE

CROSS-REFERENCE TO RELATED APPLICATION

This non-provisional application claims priority under 35 U.S.C. §119(a) on Patent Application No. 2009-72600 filed in Japan on Mar. 24, 2009, the entire contents of which are hereby incorporated by reference.

BACKGROUND

1. Technical Field

The present invention relates to an image processing device for detecting a particular pattern included in an original document image read from an original document such as a bank note, a marketable security or a classified document, and to an image forming device provided with the image processing device.

2. Description of Related Art

In recent years, a demand for an image processing device and an image forming device, which can inhibit copying of a copy-inhibited document such as a bank note or a marketable security, for example, and prevent forgery, is growing with the progress of the technique for forming a copy of an original document image. Moreover, a high emphasis is placed on enhancing security by preventing copying of an important document such as a classified document and information leak.

Conventionally, a variety of techniques for judging whether an image of a particular pattern is included in an original document image read from an original document formed on a sheet or not and stopping the formation of an image or forming an image different from the read original document image when it is judged that the image of a particular pattern is included, for example, have been proposed as techniques related to prevention of copying of such an original document image (see Japanese Utility Model Application Laid-Open No. H5-85158, Japanese Patent Application Laid-Open No. 116-178098, Japanese Patent Application Laid-Open No. 2003-99788 and Japanese Patent Application Laid-Open No. 2005-142918). For example, an image processing device provided with a function of detecting a circular image such as a bank note red seal included in an original document image is disclosed in Japanese Utility Model Application Laid-Open No. H5-85158 and Japanese Patent Application Laid-Open No. H6-178098.

An image processing device described in Japanese Utility Model Application Laid-Open No. H5-85158 first performs a thinning process for an image composed of a plurality of red pixels when detecting a red pixel in the main scanning direction in a read original document image. Then, when detecting another red pixel at a particular distance in the main scanning direction from the position of the image processed by the thinning process, the image processing device assumes that the red pixel detected first and the red pixel detected next correspond to both end positions of a segment to be the diameter of a circle and rotates the segment at a predetermined angle relative to the main scanning direction. When the positions of the two pixels at both end positions of the segment exist within a predetermined range of a position of a pixel stored in a memory, the image processing device judges that the red pixels are a circular image having a circular outline.

Moreover, an image processing device described in Japanese Patent Application Laid-Open No. H6-178098 judges that a detected pixel is a part of an image to be detected when pixels corresponding to both ends of a segment to be the diameter of a circle in the main scanning direction are detected from an original document image and a part of the circle is detected at a predetermined distance in the sub scanning direction from the center of the circle. Moreover, said image processing device counts the number of times a pixel within a predetermined interval inside a detected circle becomes on, i.e., the number of red pixels, checks whether a numerical value corresponding to particular image data prestored in a memory accords with the count value or not, and judges that an image formed of a detected pixel is a particular circular image when the numerical value accords.

Furthermore, an image processing device described in Japanese Patent Application Laid-Open No. 2003-99788 judges whether an original document image to be processed includes a particular image part, which is a part of a target image, or not and checks whether a target image candidate including the particular image part is a target image or not, so as to extract a target image in an original document image at high speed and with a high degree of accuracy.

Furthermore, an image processing device described in Japanese Patent Application Laid-Open No. 2005-142918 compares a dot pattern included in image data of an original document image with a stored particular dot pattern, and inhibits output of image data of an original document image so as to prevent unauthorized flow of information when it is judged that the dot patterns are identical.

By the way, when a part of an original document image is enlarged by an image processing device described in Japanese Utility Model Application Laid-Open No. H5-85158, Japanese Patent Application Laid-Open No. H6-178098, Japanese Patent Application Laid-Open No. 2003-99788 or Japanese Patent Application Laid-Open No. 2005-142918, an area, for which whether a particular pattern is included or not is judged, is limited to an area to be enlarged, which is a part of the original document image. For example, when copying for enlarging at 400% is to be performed, whether a particular pattern is included or not is judged only for an area, which is to be enlarged, having a size of 1/16 of the entire original document image.

SUMMARY

However, even when it is judged that a particular pattern is not included in an area to be enlarged in enlarging of a part of an original document image, the particular pattern is sometimes included in the other area of the original document image. In such a case, important information is surely included at some place of the original document image. Accordingly, there is a possibility that important information leaks from an enlarged image by enlarging such an original document image.

Moreover, when a part of a copy-inhibited document such as a bank note or a marketable security is to be enlarged, the entire original document image includes a particular pattern, which should exist in the original, though the particular pattern is often not included in an enlarged image. In such a case, an actual problem does not occur since an image is not passable even as a part of the original even when the enlarged image is reduced to the original size later. Accordingly, to widen an area, for which whether a particular pattern is included or not is judged, for such an original document image so as to prevent the copying itself may possibly cause increase of an unnecessary judgment process and false positive that an image, which is not a particular pattern, is detected as the particular pattern by mistake.

The present invention has been made in view of such a situation, and the object thereof is to provide: an image processing device, which can prevent information leak and prevent false positive of a copy-inhibited original document image when an original document image is to be enlarged or when an area of a part of an original document image is specified for subsequent image processing; and an image forming device provided with the image processing device.

An image processing device according to the present invention is an image processing device for accepting image data composed of a plurality of pixels and determining whether two particular patterns are included in a predetermined area of an image based on the accepted image data or not when the image is to be enlarged at a specified zoom level, characterized in that whether the patterns are included separately in two areas having different sizes in the image or not is determined.

In the present invention, when an image based on accepted image data is to be enlarged, whether one and the other of two particular patterns are included respectively in two areas having different sizes in an image before enlarging or not is determined.

With such a structure, false negative is prevented when whether a pattern for information leak prevention (or forgery prevention) is included in an area sufficiently larger than an area to be enlarged in an image before enlarging or not is determined. Moreover, detection, which is not indispensable, is omitted when whether a pattern for information leak prevention (or forgery prevention) is included in an area having a size substantially equal to that of an area to be enlarged in an image before enlarging or not is determined.

An image processing device according to the present invention is characterized in that whether the patterns are included separately in the entire area of the image and in an area to be enlarged or not is determined.

In the present invention, whether one and the other of two particular patterns are included respectively in the entire area of an image based on accepted image data and in an area to be enlarged or not is determined.

With such a structure, a target pattern is detected from an area necessary and sufficient for detection when whether a pattern for information leak prevention (or forgery prevention) is included in the entire area (or an area to be enlarged) of an image before enlarging or not is determined.

An image processing device according to the present invention is an image processing device for accepting image data composed of a plurality of pixels and determining whether two particular patterns are included in a predetermined area of an image based on the accepted image data or not, characterized by comprising means for accepting specification of an area in the image, wherein whether one of the two patterns is included in the area whose specification has been accepted by said means, or not is determined.

In the present invention, specification of an area in an image based on accepted image data is accepted and whether one of two particular patterns is included in the accepted area or not is determined.

With such a structure, a target pattern is detected from an area necessary and sufficient for detection when whether a pattern for information leak prevention (or forgery prevention) is included in the entire area (or an area whose specification has been accepted) of the image or not is determined.

An image processing device according to the present invention is characterized by comprising means for storing image data belonging to the area.

In the present invention, only image data belonging to an specified area is stored and therefore the capacity of a memory to be used for storing image data for subsequent processes is reduced.

An image forming device according to the present invention is characterized by comprising: an image processing device described in any one of the above inventions; and means for forming an output image based on an image, for which the image processing device has determined that two particular patterns are not included respectively in two particular areas.

In the present invention, an output image is formed on the basis of an image, for which an image processing device described in any one of the present inventions has determined that two particular patterns are not included respectively in two particular areas.

With such a structure, an image processing device, which can prevent information leak and prevent false positive of a copy-inhibited original document image, is applied to an image forming device.

With the present invention, false negative is prevented when whether a pattern for information leak prevention (or forgery prevention) is included in an area sufficiently larger than an area to be enlarged in an image before enlarging based on accepted image data or not is determined. Moreover, detection, which is not indispensable, is omitted when whether a pattern for information leak prevention (or forgery prevention) is included in an area having a size substantially equal to that of an area to be enlarged or not is determined. Moreover, a target pattern is detected from an area necessary and sufficient for detection when whether a pattern for information leak prevention (or forgery prevention) is included in the entire area (or an area whose specification has been accepted) of an image based on accepted image data or not is determined.

Accordingly, when an original document image is to be enlarged or when an area of a part of an original document image is specified for subsequent image processing, it becomes possible to prevent information leak and prevent false positive of a copy-inhibited original document image.

The above and further objects and features of the invention will more fully be apparent from the following detailed description with accompanying drawings.

BRIEF DESCRIPTION OF THE SEVERAL VIEWS OF THE DRAWINGS

FIG. 10 is a diagram for illustrating a judgment condition using a template;

FIGS. 15A, 15B, 15C, 15D and 15E are explanatory diagrams for illustrating a pattern (area) of a template set for detecting a candidate of a leak-preventing identification mark;

FIGS. 17A and 17B are explanatory diagrams for illustrating a peripheral count area of a template and a configuration example for judgment using the template;

FIGS. 18A and 18B are explanatory diagrams for illustrating a first central count area of a template and a configuration example for judgment using the template;

FIGS. 19A and 19B are explanatory diagrams for illustrating a second central count area of a template and a configuration example for judgment using the template;

FIGS. 20A and 20B are explanatory diagrams for illustrating a third central count area of a template and a configuration example for judgment using the template;

DETAILED DESCRIPTION

Figure 1:
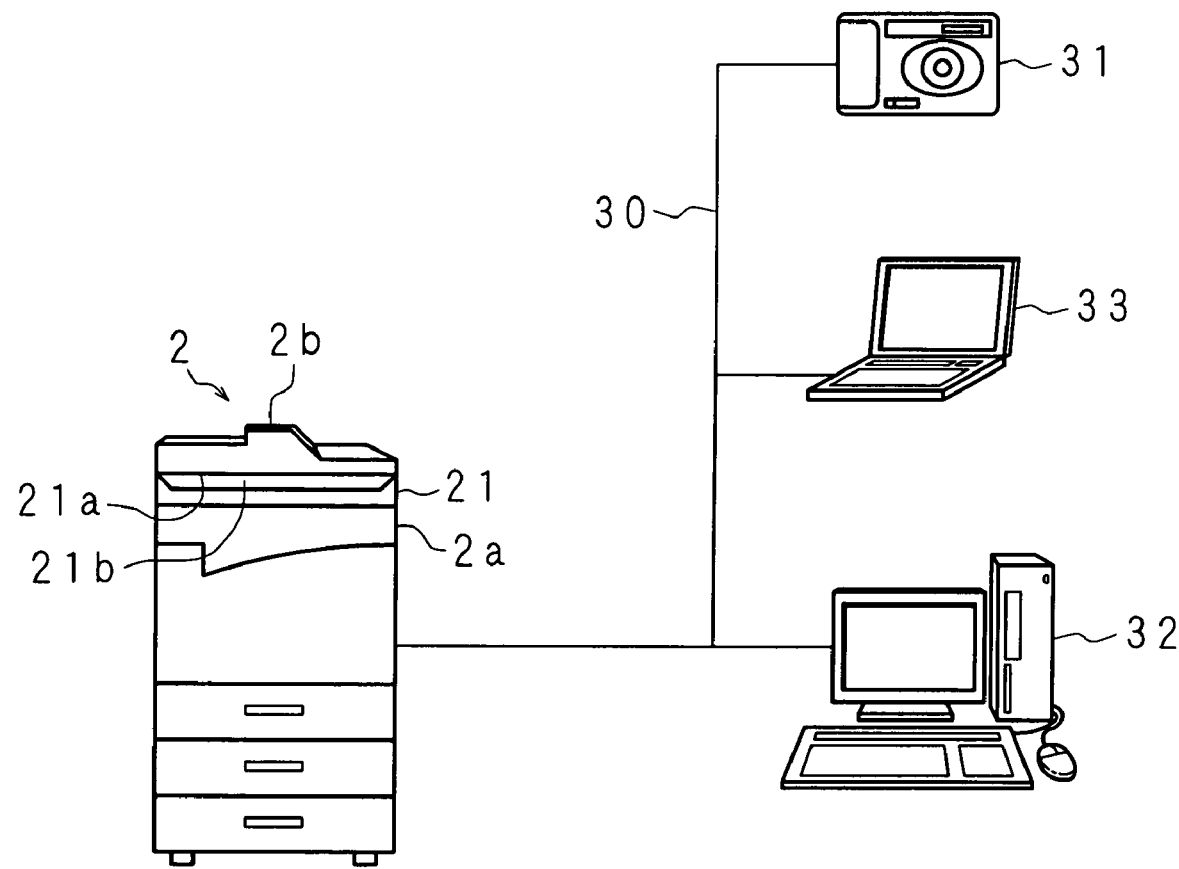
FIG. 1 is a schematic diagram for illustrating a configuration example of an image forming system including a digital multi-function peripheral of the present embodiment.

The following description will explain an image processing device and an image forming device according to the present invention in detail with reference to an embodiment applied to a digital multi-function peripheral. FIG. 1 is a schematic diagram for illustrating a configuration example of an image forming system including a digital multi-function peripheral of the present embodiment. Denoted by reference numeral 2 in the figure is a digital multi-function peripheral, and the digital multi-function peripheral 2 is connected with a digital camera 31, a personal computer (which will be hereinafter referred to as a PC) 32 and a notebook-sized personal computer (which will be hereinafter referred to as a notebook PC) 33 through a network 30.

The digital multi-function peripheral 2 comprises: a main device 2a having, at an upper part thereof, an image reading section 21, which is provided with a document stage 21a made of transparent glass on an upper face thereof, and an automatic document processing section 2b for feeding an original document on the document stage 21a. An operation section 21b for accepting an operation of the user is provided at the front side of the original stage 21a. The automatic document processing section 2b is constructed to be freely rotated on a hinge (not illustrated) coupled with the image reading section 21, so that the user can place an original document manually while opening the upper side of the document stage 21a. The digital multi-function peripheral 2 is constructed in such a way that image data from the digital camera 31, the PC 32 and the notebook PC 33 can be acquired through an interface (not illustrated) provided at a proper position in the main device 2a.

Figure 2:
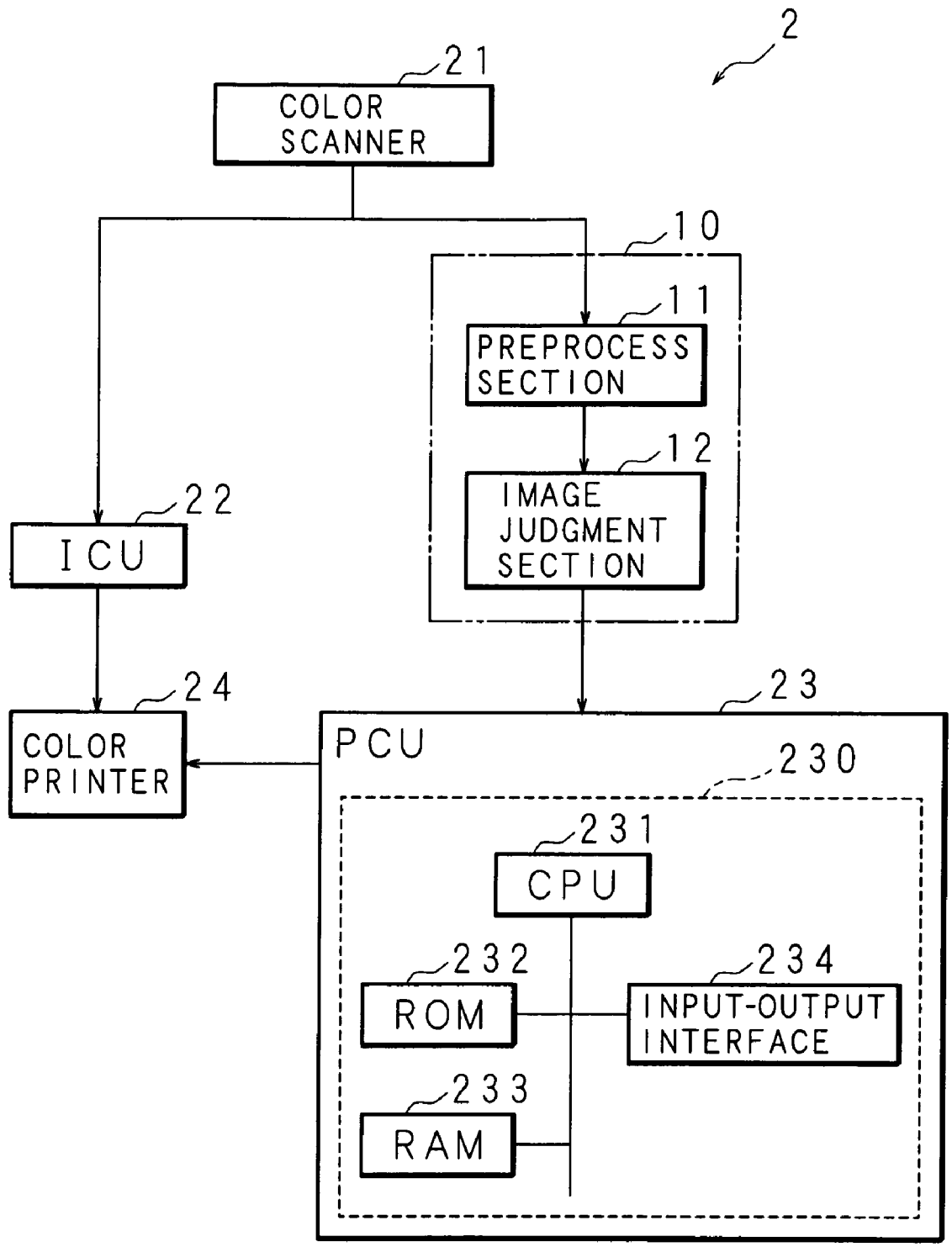
FIG. 2 is a block diagram for illustrating the configuration outline of the digital multi-function peripheral.

FIG. 2 is a block diagram for illustrating the configuration outline of the digital multi-function peripheral 2. The digital multi-function peripheral 2 comprises an image processing section 10 inside the main device 2a. Image data of an original document image obtained by reading an original document formed on a sheet with the image reading section (color scanner) 21 and image data retrieved from the digital camera 31, the PC 32 and the notebook PC 33 through the network 30 are inputted into the image processing section 10. The image data to be inputted into the image processing section 10 is also inputted into a formed image processing section (which will be hereinafter referred to as an ICU) 22. The image processing section 10 comprises: a preprocess section 11 for processing inputted image data to be suited for detection of a particular pattern; and an image judgment section 12 for performing detection of a particular pattern for image data processed at the preprocess section 11. The image judgment section 12 outputs the result of detection of a particular pattern from image data to a printer control section (which will be hereinafter referred to as a PCU) 23.

The image processing section 10, the ICU 22, the PCU 23 and the operation section 21b constitute an image processing device of the present invention.

Moreover, the image judgment section 12 of the present embodiment detects a forgery-preventing identification mark (a pattern indicating that copying of an image is inhibited) and a leak-preventing identification mark (a pattern indicating that unauthorized use of an image is inhibited), which will be described later, as particular patterns.

The ICU 22 performs a predetermined process for inputted image data to be suited for formation on a sheet, stores the image data once in an image memory 223 (see FIG. 3B), which will be described later, and then outputs the image data to an image forming section 24. The image forming section 24 is a color printer for forming an image on a sheet. Moreover, a signal for controlling image formation on a sheet is inputted from the PCU 23 into the image forming section 24.

When an area is specified through the operation section 21b, the image data stored in the image memory 223 is held in the image memory 223 until the next process is instructed from the operation section 21b.

The image reading section 21 comprises: an optical system (not illustrated) such as a light source for irradiating an original document placed on the document stage 21a with light; and a CCD line sensor (not illustrated) having a plurality of photoelectric conversion elements (which will be hereinafter referred to as CCDs: Charge Coupled Devices) for converting reflected light from the original document into an electrical signal having the respective color components of R (red), G (green) and B (blue), arranged in the main scanning direction. The image reading section 21 irradiates an original document placed at a predetermined position on the document stage 21a with light emitted from the light source in response to an instruction to start reading, which is inputted from the operation section 21b, forms an image at the CCD line sensor with the reflected light from the original document while moving the optical system in a sub scanning direction perpendicular to the main scanning direction in a horizontal plane, and converts the image into an electrical signal.

The image reading section 21 further corrects characteristics such as the light distribution characteristics of the light source at the time when the original document is read or the sensitivity unevenness of the CCD line sensor as to the electrical signal outputted from the CCD line sensor, and outputs the corrected electrical signal to the image processing section 10 and the ICU 22 as image data. Said image data can also be outputted to the PC 32 and the notebook PC 33 through the network 30.

The image data to be outputted from the image reading section 21 is composed of pixel values (pixel data) of a plurality of pixels and can represent so-called full color having 16777216 colors since the respective RGB colors of the respective pixels respectively have 256 levels. Moreover, the optical resolution of the image reading section 21 in the main scanning direction and the sub scanning direction is 600 dpi.

The PCU 23 is provided with a control section 230 wherein a CPU 231 is connected with a ROM 232, a RAM 233 and an input-output interface 234 through a bus. The CPU 231 controls the operation of the entire digital multi-function peripheral 2 through the input-output interface 234 in such a way that the respective parts of the digital multi-function peripheral 2 operate in synchronization in accordance with a control program prestored in the ROM 232. When the image processing section 10 detects a particular pattern from image data, the PCU 23 controls the image forming section 24 not to form an output image on the basis of image data acquired from the ICU 22. In such a case, the PCU 23 displays a warning at a display (not illustrated) of the operation section 21b and erases the image data stored in the image memory 223.

The image forming section 24 comprises: a photoconductive drum; a laser writing device for forming an electrostatic latent image on the photoconductive drum; a developing element for developing the formed electrostatic latent image and forming a toner image on the photoconductive drum; and a transferring element for transferring the formed toner image onto a sheet, and forms an output image on a sheet on the basis of the image data acquired from the ICU 22, by a so-called electrophotographic method.

The image forming section 24 may be constructed to form an image by a method other than the electrophotographic method, such as an ink-jet method, a thermal transfer method or a sublimation method. Moreover, when being controlled by the PCU 23 not to form an output image, the image forming section 24 may add proper noise to the image data acquired from the ICU 22 and form an output image on the basis of the obtained image data.

Figure 3A:
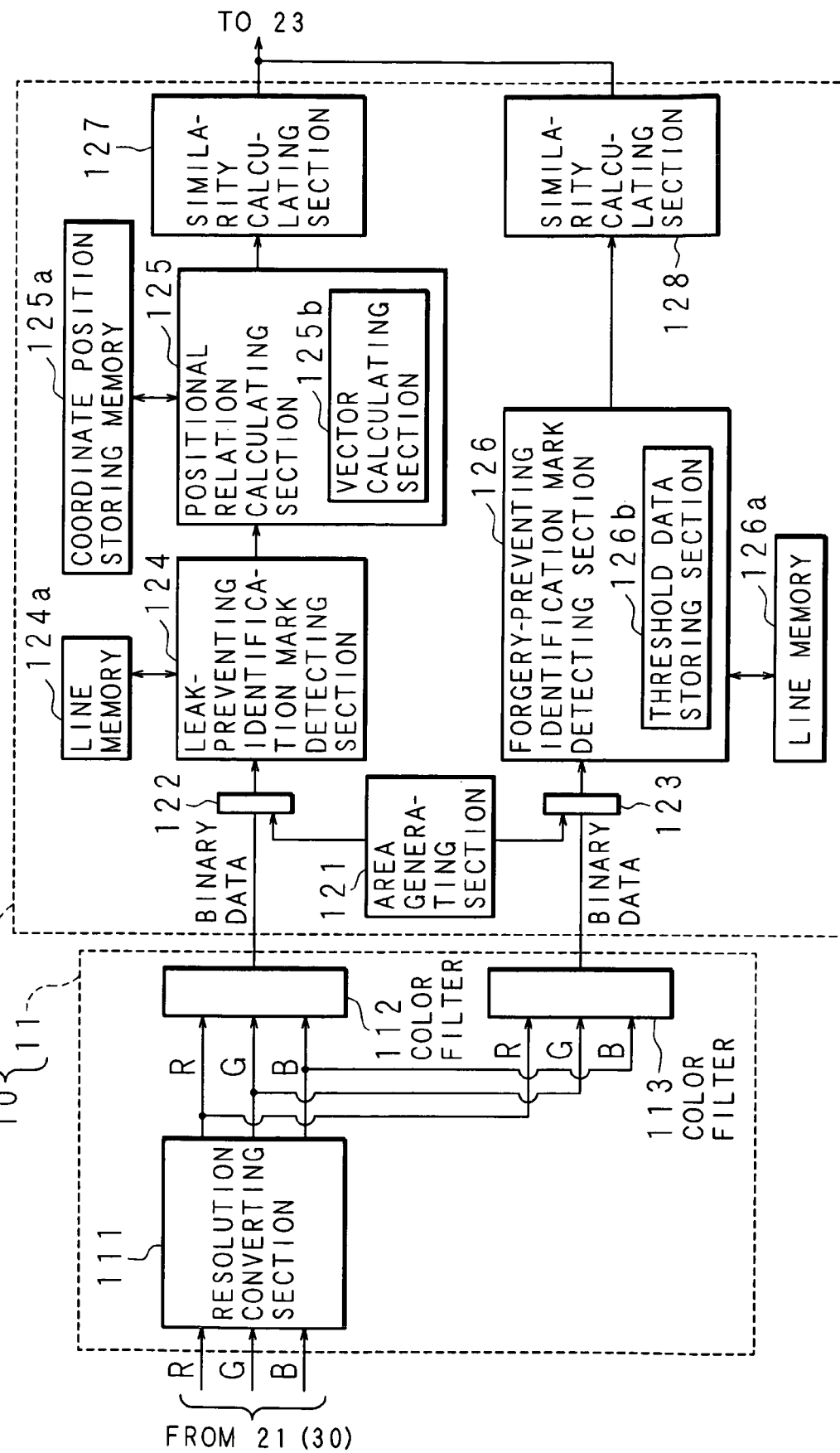
FIGS. 3A and 3B are functional block diagrams for illustrating the configuration of an image processing section and an ICU.
Figure 3B:
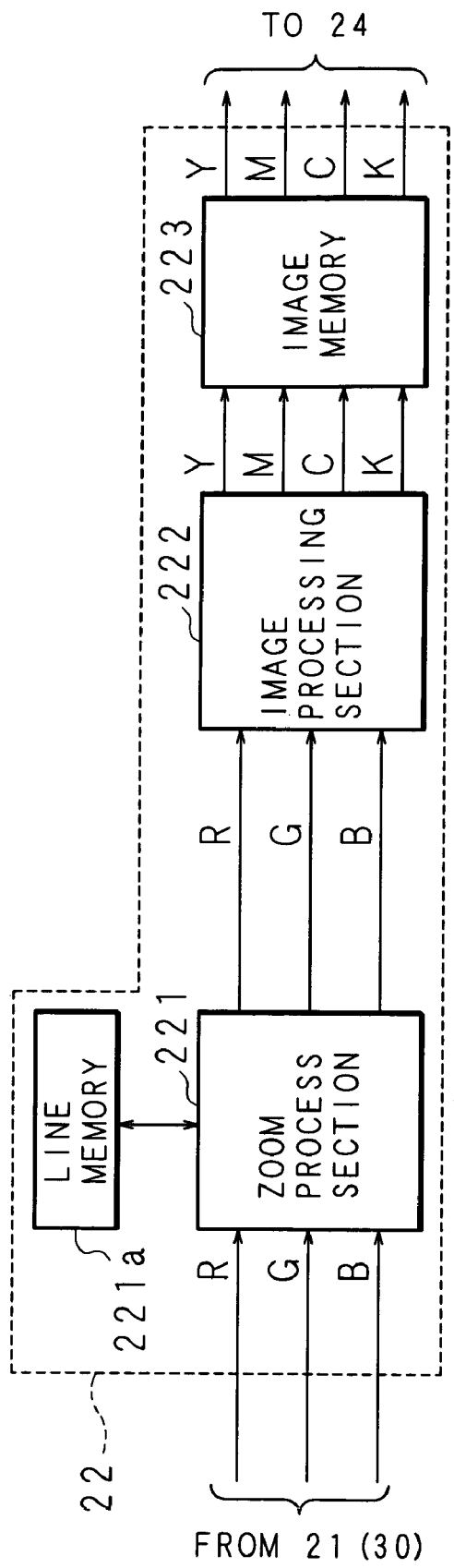

FIGS. 3A and 3B are functional block diagrams for illustrating the configuration of the image processing section 10 and the ICU 22. Image data is inputted into the ICU 22 from the image reading section 21, and from the PC 32 or the like through the network 30. The ICU 22 comprises: a zoom process section 221 for performing zoom process (magnification change) on inputted image data into a specified zoom level; and an image processing section 222 for converting RGB image data outputted from the zoom process section 221 into CMYK (C: cyan, M: magenta, Y: yellow, B: black) image data. The ICU 22 also comprises the image memory 223 for storing image data of a specified area or the entire area of each page in the CMYK image data outputted from the image processing section 222. The zoom process section 221 is provided with a line memory 221a functioning as a working memory.

The image processing section 222 performs image process such as color correction for image data in addition to the conversion described above and stores the image data in the image memory 223.

Image data is inputted into the preprocess section 11 of the image processing section 10 from the image reading section 21, and from the PC 32 or the like through the network 30. The preprocess section 11 comprises a resolution converting section 111 for converting inputted RGB image data having a resolution of up to 600 dpi into image data having a low resolution of 100 dpi or 200 dpi. The resolution converting section 111 outputs the obtained image data having a low resolution to color filters 112 and 113. The color filters 112 and 113 respectively convert the image data having a low resolution acquired from the resolution converting section 111 into black-and-white 2-gradation image data having a pixel value of 1 and 0 (binary data) on the basis of the respective predetermined thresholds. The color filters 112 and 113 output the obtained 2-gradation image data to the image judgment section 12.

As described above, the preprocess section 11 converts the image data inputted into the image processing section 10 into image data having a small amount of information and outputs the image data to the image judgment section 12. Accordingly, it is possible to reduce the capacity of line memories 124a and 126a, which will be described later, and to perform a process such as detection or judgment at high speed at the image judgment section 12 at a subsequent stage.

The image judgment section 12 of the image processing section 10 comprises: an area generating section 121; judgment area deciding section 122, 123; a leak-preventing identification mark detecting section 124; a positional relation calculating section 125; a forgery-preventing identification mark detecting section 126; similarity calculating section 127, 128; and the like. The area generating section 121 outputs a signal representing the respective regions, such as an area to be enlarged by the zoom process section 221 of the ICU 22 or an area specified by the user through the operation section 21b, to the judgment area deciding section 122, 123. The judgment area deciding sections 122 and 123 respectively extract image data included in the regions represented by the respective signals inputted from the area generating section 121 from the image data inputted respectively from the color filters 112 and 113 of the preprocess section 11, and output the image data respectively to the leak-preventing identification mark detecting section 124 and the forgery-preventing identification mark detecting section 126. In such a manner, the image judgment section 12 can limit image data to be inputted into the leak-preventing identification mark detecting section 124 and the forgery-preventing identification mark detecting section 126 only to image data included in an area generated by the area generating section 121 of image data inputted from the preprocess section 11. The leak-preventing identification mark detecting section 124 and the forgery-preventing identification mark detecting section 126 respectively have the line memories 124a and 126a, and store the inputted image data once in the respective line memories 124a and 126a.

The leak-preventing identification mark detecting section 124 and the forgery-preventing identification mark detecting section 126 respectively detect a candidate of a leak-preventing identification mark and a forgery-preventing identification mark from the image data stored respectively in the line memories 124a and 126a. The positional relation calculating section 125 calculates the geometric positional relation of a pattern of the candidate of a leak-preventing identification mark detected by the leak-preventing identification mark detecting section 124. The positional relation calculating section 125 is provided with a vector calculating section 125b for calculating the linearity of a pattern included in the candidate of a leak-preventing identification mark. The positional relation calculating section 125 is connected with a coordinate position storing memory 125a for storing the coordinate of the respective points to be calculated, in calculation of the linearity of a pattern by the vector calculating section 125b. The forgery-preventing identification mark detecting section 126 is provided with a threshold data storing section 126b for storing a criterion threshold of a pattern to be detected.

When judging that patterns included in the candidate of a leak-preventing identification mark detected by the leak-preventing identification mark detecting section 124 are arranged linearly, the vector calculating section 125b judges that a leak-preventing identification mark has been detected. When a leak-preventing identification mark and a forgery-preventing identification mark are respectively detected by the positional relation calculating section 125 and the forgery-preventing identification mark detecting section 126, the image judgment section 12 increments the numbers of mark pairs held respectively in the similarity calculating section 127, 128, and notify the PCU 23 of detection when the numbers of mark pairs respectively become equal to or larger than predetermined values.

Figure 4:
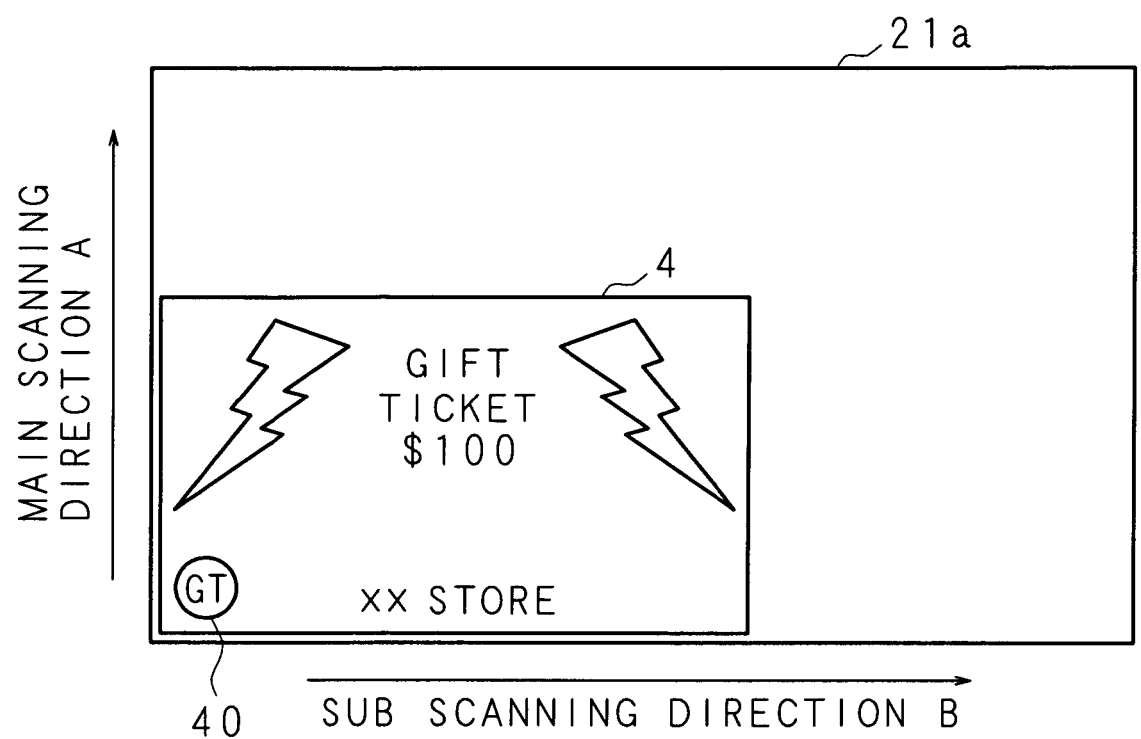
FIG. 4 is an explanatory diagram for schematically illustrating the state where an image reading section reads an original document.

FIG. 4 is an explanatory diagram for schematically illustrating the state where the image reading section 21 reads an original document. FIG. 4 illustrates an original document 4 of a gift ticket seen from the lower face side of the original stage 21a, and a pattern 40 for forgery prevention is formed at a part (predetermined place) of the original document 4. Image data corresponding to one line composed of a plurality of pixels is acquired from the CCD line sensor of the image reading section 21 every time the CCD line sensor scans reflected light from the original document 4 in the main scanning direction A. Moreover, image data for the entire face or a part of the original document 4 is acquired by moving the optical system in the sub scanning direction B with a predetermined stepping period by a stepping motor (not illustrated). The acquired image data and the image data acquired through the network 30 are outputted to the image forming section 24 after the zoom level thereof is changed by the ICU 22.

Figure 5A:
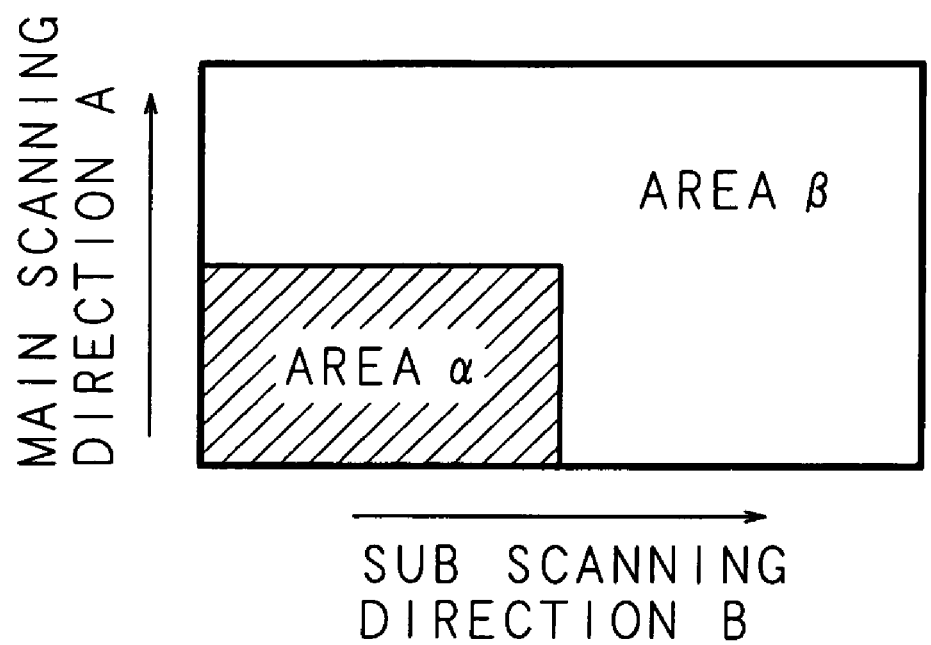
FIGS. 5A and 5B are explanatory diagrams for schematically illustrating how an area of a part of an image is enlarged at the ICU.
Figure 5B:
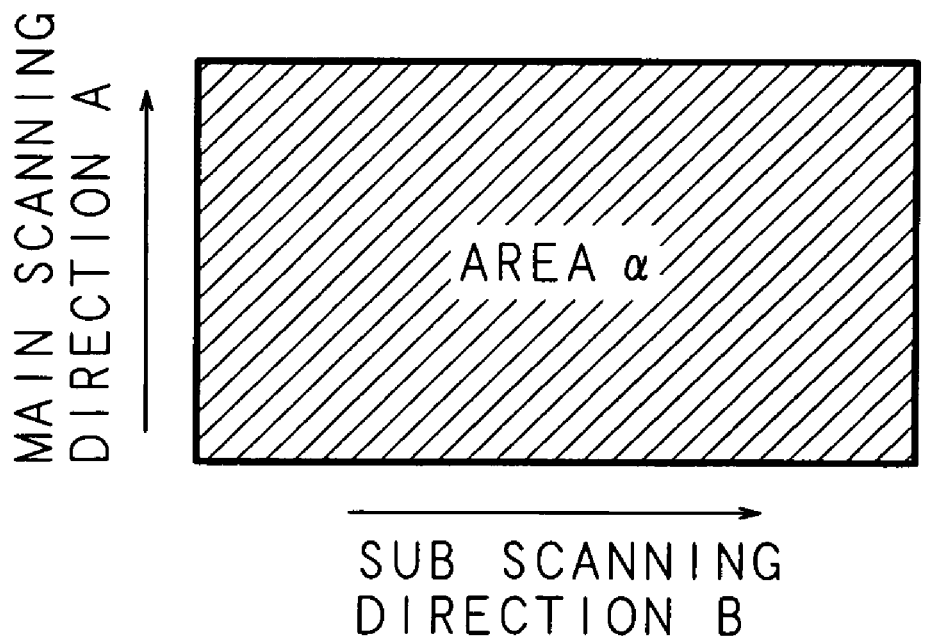

FIGS. 5A and 5B are explanatory diagrams for schematically illustrating how an area of a part of an image is enlarged at the ICU 22. The "area α+area β" illustrated in FIG. 5A is an image corresponding to one page before the zoom level changing. For example, when an image of the "area α" having a size of ¼ of the "area α+area β" is to be doubled in size, the image is doubled in size respectively in the main scanning direction A and in the sub scanning direction B and therefore the image after enlarging becomes an image of the "area α" illustrated in FIG. 5B. The image of the "area α" illustrated in FIG. 5B is an image corresponding to one page having a size equal to that of the image of the "area α+area β" illustrated in FIG. 5A. That is, when an image is to be doubled in size, the image to be enlarged is a part corresponding to a size of ¼ of an image inputted into the ICU 22. Similarly, when an image is to be tripled or quadrupled in size, the image to be enlarged is a part respectively corresponding to a size of ⅑ or ¹⁄₁₆ of an image inputted into the ICU 22.

Figure 6:
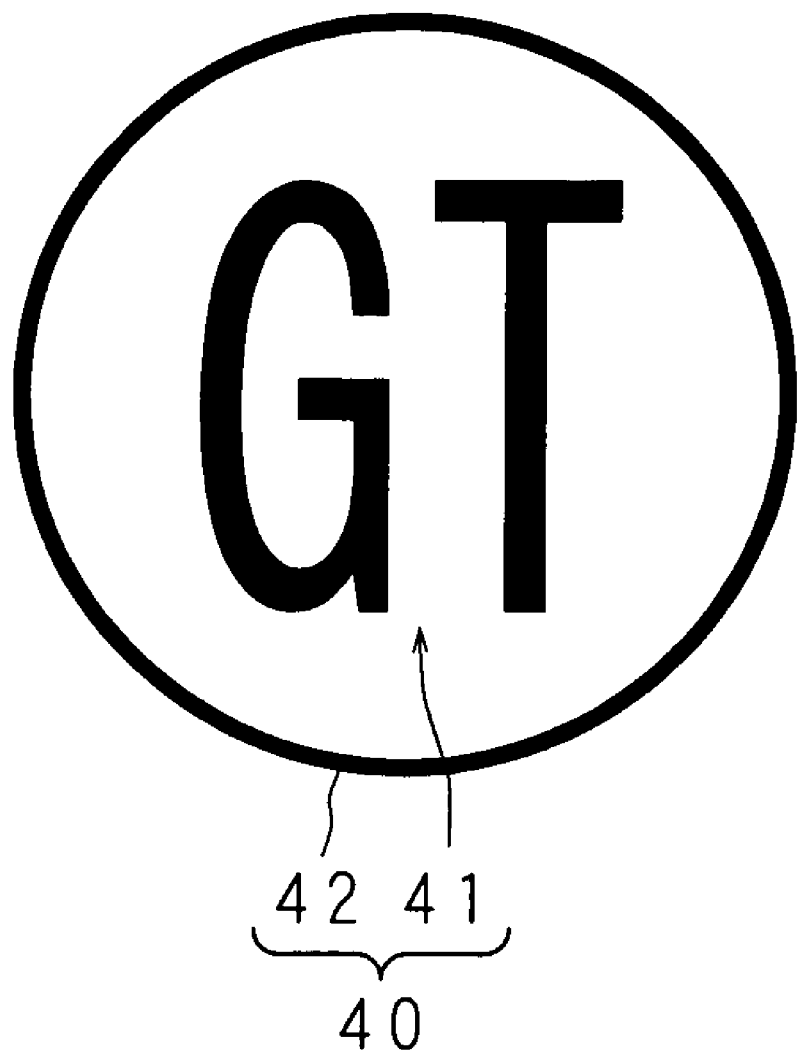
FIG. 6 is a schematic diagram for illustrating a configuration example of a pattern having an image of a forgery-preventing identification mark.

FIG. 6 is a schematic diagram for illustrating a configuration example of a pattern having an image of a forgery-preventing identification mark. A forgery-preventing identification mark in the present embodiment is the pattern 40 obtained by describing an image 41 of alphabetical characters of "GT" in an annular image 42 as illustrated in FIG. 6. The pattern 40 indicates that an original document on which the pattern 40 is formed is a gift ticket and copying of the original document is inhibited.

A forgery-preventing identification mark is not limited to a mark such as the pattern 40 and, for example, a red seal printed on a bank note may be used as a forgery-preventing identification mark when an original document is a bank note.

The following description will explain a process for detecting the pattern 40 as a forgery-preventing identification mark from the image data stored in the line memory 126a by the forgery-preventing identification mark detecting section 126.

An example of an image including a forgery-preventing identification mark is an original document image obtained by reading an original document such as a marketable security or a bank note. When an area including no forgery-preventing identification mark in such an original document image is doubled in size, for example, a forgery-preventing identification mark is not included in a formed image even if an image is halved in size later and formed on a sheet. Accordingly, a sheet having such an image formed thereon is not passable even as a part of a marketable security or a bank note.

Consequently, when the "area α" in an original document is to be doubled in size as illustrated in FIGS. 5A and 5B, for example, the forgery-preventing identification mark detecting section 126 has only to detect a forgery-preventing identification mark from image data included in the "area α". Accordingly, in such a case, the area generating section 121 outputs a signal representing the range of the "area α" to the judgment area deciding section 123 so that only image data included in the "area α" is inputted into the forgery-preventing identification mark detecting section 126. In such a manner, the forgery-preventing identification mark detecting section 126 can perform detection of a forgery-preventing identification mark only for the "area α", and power consumption of the processing circuit and noise to be generated by the processing circuit can be reduced by an amount corresponding to the decrease in the area where a forgery-preventing identification mark is to be detected. Moreover, it is possible to reduce an unnecessary process since the forgery-preventing identification mark detecting section 126 does not perform unnecessary detection of a forgery-preventing identification mark for the "area α".

However, it is obvious that image data included in an area larger than the "area α" may be inputted into the forgery-preventing identification mark detecting section 126 so as to widen an area where a forgery-preventing identification mark is to be detected.

Figure 7A:
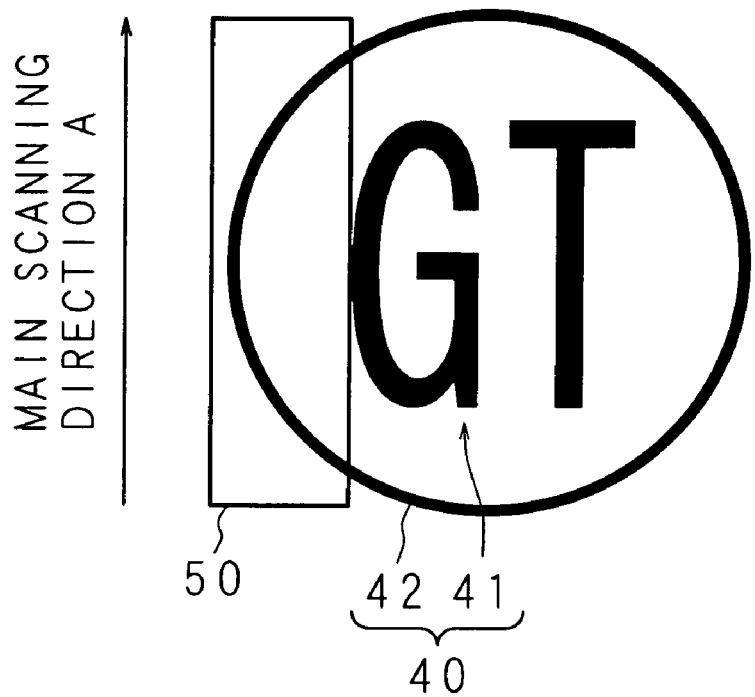
FIGS. 7A and 7B are explanatory diagrams for explaining a process for detecting an annular image forming a part of a pattern.
Figure 7B:
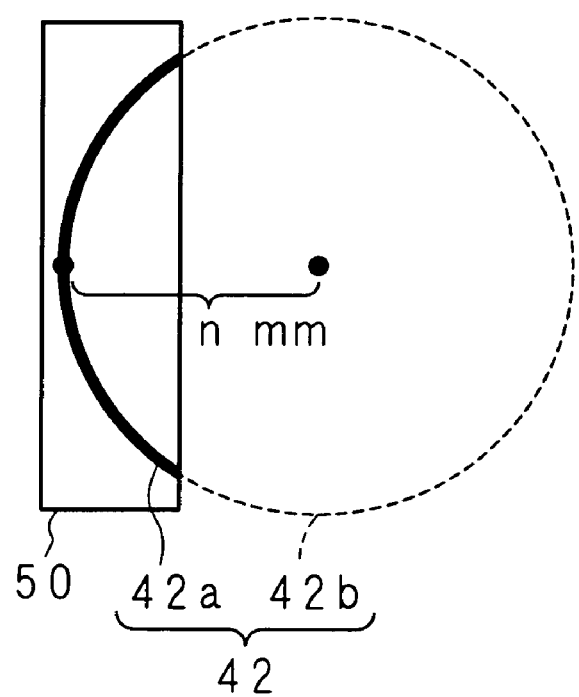
Figure 8:
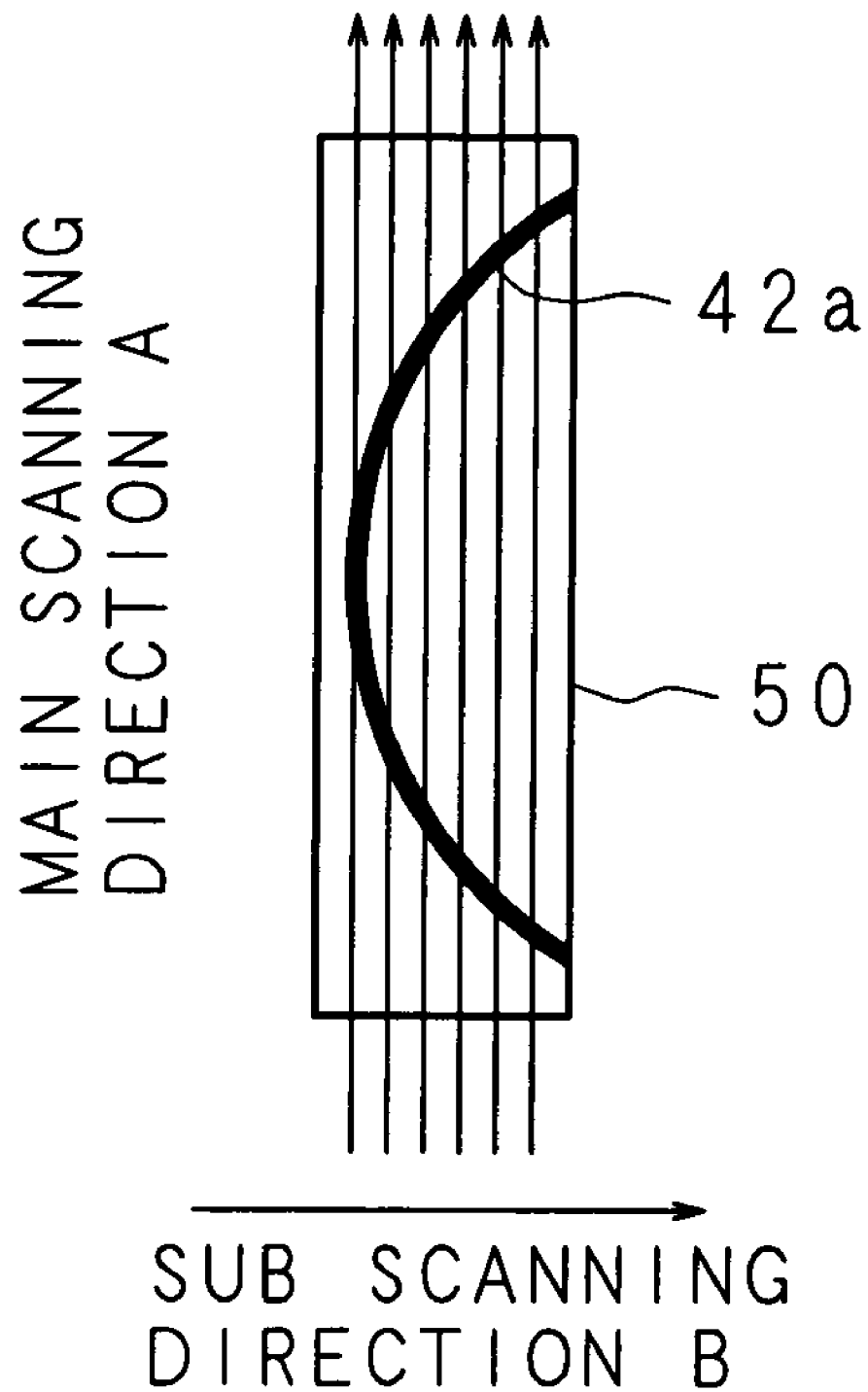
FIG. 8 is an explanatory diagram for illustrating the relation between a judgment window for detecting an arc of a pattern and an arc.

FIGS. 7A and 7B are explanatory diagrams for explaining a process for detecting the annular image 42 forming a part of the pattern 40, and FIG. 8 is an explanatory diagram for illustrating the relation between a judgment window 50 for detecting an arc of the pattern 40 and an arc. The judgment window 50 has a rectangular shape with the longitudinal direction thereof being oriented to the main scanning direction A of the original document image, and has a width corresponding to 6 lines, i.e., 6 pixels in the sub scanning direction B. The forgery-preventing identification mark detecting section 126 superimposes the judgment window 50 over an original document image (a detection object area where a forgery-preventing identification mark is to be detected) based on the image data stored in the line memory 126a while displacing the window by one pixel at a time in the main scanning direction A and the sub scanning direction B, and reads out, in series, image data corresponding to the pixels in the area where the judgment window 50 is superimposed from the line memory 126a. The forgery-preventing identification mark detecting section 126 then determines whether the arc 42a, which is a part of a circle formed of the annular image 42, is included in the image data read out in series or not.

For example, assume that the radius of a circle formed of the image 42 of the pattern 40 is n (mm) in an original document image read out in a state where the vertical direction of the alphabetical characters of "GT" is substantially oriented to the main scanning direction A as illustrated in FIGS. 4 and 7A. Here, when the curvature radius of an arc 42a detected on the basis of the image data corresponding to the judgment window 50, which is read out from the line memory 126a, is n (mm) as illustrated in FIG. 7B, the forgery-preventing identification mark detecting section 126 judges that the annular image 42 has been detected, on the basis of the arc 42a and an arc 42b extrapolated from the arc 42a.

Figures 9A, 9B:
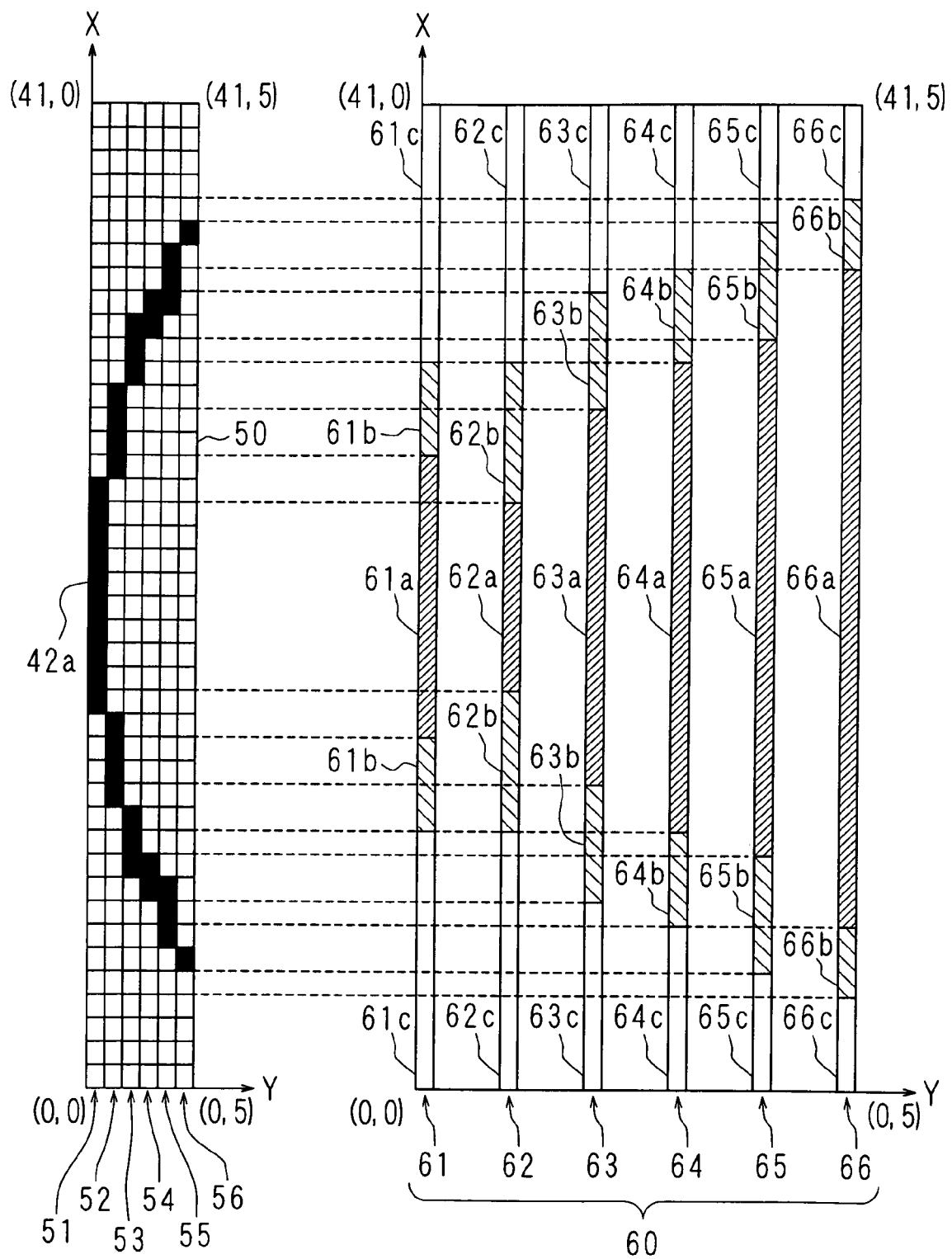
FIGS. 9A and 9B are explanatory diagrams for illustrating the correspondence between an image in the judgment window and a template for detecting an arc.

FIGS. 9A and 9B are explanatory diagrams for illustrating the correspondence between an image in the judgment window 50 and a template 60 for detecting the arc 42a. An image in the judgment window 50 means an image based on the image data read out from the line memory 126a in accordance with the judgment window 50. An image in the judgment window 50 is represented by line data 51 to 56 respectively having 42 pixel data arranged in series in the main scanning direction A as illustrated in FIG. 9A. In FIG. 9A, pixel values of 0 and 1 of the respective pixel data respectively represent white and black.

On the contrary, the template 60 to be applied (template matching) to the line data 51 to 56 is composed of the first line 61 to the sixth line 66 respectively having an area associated with 42 pixels arranged in series in the main scanning direction A as illustrated in FIG. 9B.

Hereinafter, assume that the pixel position in the Y direction is plotted on the abscissa axis and the pixel position in the X direction is plotted on the ordinate axis in FIGS. 9A and 9B, so that the position of each pixel is represented by a coordinate of (X, Y).

For example, regarding the line data 51 of the judgment window 50, the pixel value of pixel data in the coordinates of (0, 0) to (15, 0) and (26, 0) to (41, 0) is 0 and the pixel value of pixel data in the coordinates of (16, 0) to (25, 0) is 1.

On the other hand, in the template 60, the first line 61 to the sixth line 66 are respectively split into three areas. For example, the first line 61 is split into a first area 61a of coordinates of (15, 0) to (26, 0), a second area 61b, 61b of coordinates of (11, 0) to (14, 0) and (27, 0) to (30, 0), and a third area 61c, 61c of coordinates of (0, 0) to (10, 0) and (31, 0) to (41, 0). The same goes for the second line 62 to the sixth line 66.

The coordinate position of the respective start points and end points of the first areas 61a to 66a, the second areas 61b to 66b and the third areas 61c to 66c is preset depending on the shape and the width of the arc 42a, so that the shape of the arc 42a is approximated by a curve connecting the central part of the first area 61a with the central part of the second area 62b, 63b, 64b, 65b or 66b smoothly. The template 60 having such a structure is stored in a storing section, which is not illustrated, of the forgery-preventing identification mark detecting section 126.

When the template 60 is applied to an image in the judgment window 50, the first line 61 to the sixth line 66 of the template 60 are respectively superimposed over the line data 51 to 56 in the judgment window 50 in such a way that the coordinate of (X, Y) in FIG. 9B accords with the coordinate of (X, Y) in FIG. 9A. Then, the number of black pixels in the line data 51 to 56 existing at positions overlapped respectively with the first area 61a to 66a, the second area 61b to 66b and the third area 61c to 66c is counted.

FIG. 10 is a diagram for illustrating a judgment condition using the template 60. The respective columns in FIG. 10 represent the first line 61 to the sixth line 66 from left to right and the respective rows represent the first areas 61a to 66a, the second areas 61b to 66b and the third areas 61c to 66c from top to bottom. The range of the number of black pixels to exist at a position overlapped with an area of a template corresponding to each cell is written in each of the eighteen (6 columns×3 rows) cells illustrated in FIG. 10.

That is, when an image in the judgment window 50 is represented by the line data 51 to 56, it is judged that the image in the judgment window 50 is the arc 42a when the distribution of black pixel data in the respective line data 51 to 56 fits the distribution of the range of the number of black pixels illustrated in FIG. 10.

For example, when the first line 61 in FIG. 9B is superimposed over the line data 51 in FIG. 9A, the number of black pixels of the line data 51 respectively existing in the first area 61a, the second area 61b and the third area 61c are 10, 0 and 0, and said numbers suit the range (equal to or larger than 9, equal to or smaller than 2, and equal to or smaller than 1) illustrated in the first line column in FIG. 10. When the second line 62 to the sixth line 66 in FIG. 9B are respectively superimposed over the line data 52 to 56 in FIG. 9A, the numbers also respectively suit the range illustrated in the columns of the second line to the sixth line in FIG. 10 and therefore it is judged that an image in the judgment window 50 in FIG. 9A is the arc 42a.

When the arc 42a is detected from an image in the judgment window 50, it becomes possible to extract a circulate area (pattern detection area), which can possibly include the pattern 40, by estimating a circle including the detected arc 42a. For discriminating the sort of an image included in the pattern detection area, the pattern detection area is split into four split areas and the number of pixels in each split area (the distribution of the number of pixels in the pattern detection area) is checked.

Figures 11A, 11B:
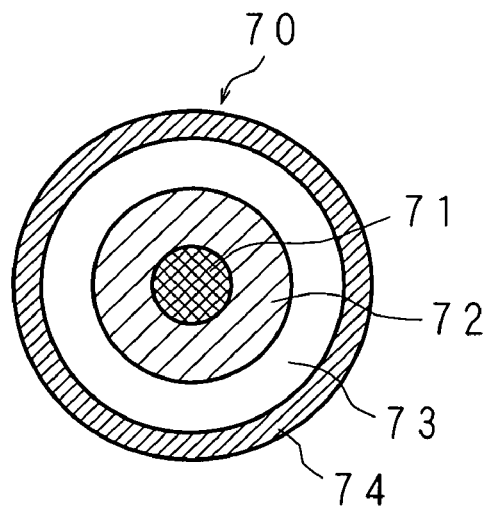
FIGS. 11A and 11B are explanatory diagrams for explaining the relation between a split example of a pattern detection area and the distribution of the number of pixels.

FIGS. 11A and 11B are explanatory diagrams for explaining the relation between a split example of the pattern detection area and the distribution of the number of pixels.

FIG. 11A illustrates a split example. In this example, an extracted pattern detection area 70 is split in a concentric fashion, and an area surrounded by a circumference having the smallest radius is referred to as a first split area 71, an area surrounded by said circumference and a circumference having the second smallest radius is referred to as a second split area 72, an area surrounded by said circumference and a circumference having the third smallest radius is referred to as a third split area 73, and an area surrounded by said circumference and the outer circumference is referred to as a fourth split area 74.

FIG. 11B illustrates a table for defining the range of the number of black pixels in the respective split areas 71, 72, 73 and 74 as a criterion and whether the pattern 40 is included in the pattern detection area 70 or not is judged in accordance with the table. For example, it is judged that the pattern 40 is included in the pattern detection area 70 when the conditions that the number of black pixels in the first split area 71 is within the range of 246 to 300, the number of black pixels in the second split area 72 is within the range of 250 to 302, the number of black pixels in the third split area 73 is within the range of 266 to 310 and the number of black pixels in the fourth split area 74 is equal to or larger than 480 are satisfied.

The criterion threshold illustrated in the table in FIG. 11B is prestored in the threshold data storing section 126b so as to be read out and rewritten in response to an instruction from the PCU 23.

When detecting the pattern 40 in the pattern detection area 70, the forgery-preventing identification mark detecting section 126 notifies the similarity calculating section 128 of the fact that the pattern 40 has been detected. When receiving the notification from the forgery-preventing identification mark detecting section 126, the similarity calculating section 128 increments the number of mark pairs held therein. When the incremented number of mark pairs becomes equal to or larger then a predetermined threshold, the similarity calculating section 128 notifies the PCU 23 of detection of a forgery-preventing identification mark (which will be hereinafter referred to as Detection 1).

Next, a process for detecting a leak-preventing identification mark from image data stored in the line memory 124a by the leak-preventing identification mark detecting section 124 and the positional relation calculating section 125 will be described.

As important information is surely formed in some area of an original document including a leak-preventing identification mark, it is difficult to determine in which area the information exists. Accordingly, it is necessary to block enlarging even when an area including no leak-preventing identification mark is to be enlarged, for example.

Consequently, the area generating section 121 of the present embodiment outputs a signal representing the range of the "area α+area β" to the judgment area deciding section 122 even when the "area α" in an original document is to be doubled in size as illustrated in FIGS. 5A and 5B, for example. In such a manner, the judgment area deciding section 122 outputs image data included in the "area α+area β" (i.e., the entire original document image) to the leak-preventing identification mark detecting section 124. Accordingly, the leak-preventing identification mark detecting section 124 can perform detection of a leak-preventing identification mark for the "area α+area β" and can detect a leak-preventing identification mark without omission from the entire original document image. The same goes for the case where the image is enlarged with a zoom level other than twice.

Figure 12:
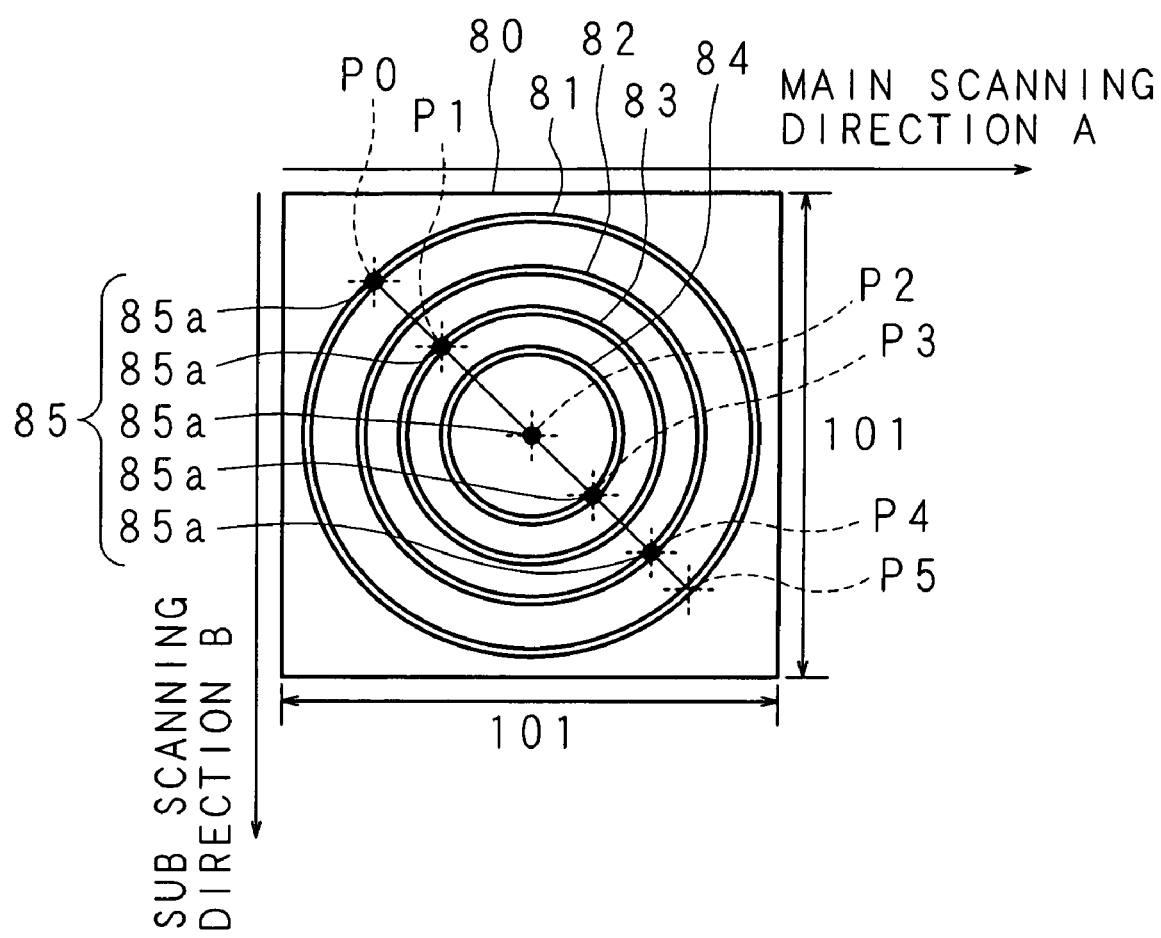
FIG. 12 is an explanatory diagram for illustrating an example of a leak-preventing identification mark and a template for detecting the leak-preventing identification mark.

FIG. 12 is an explanatory diagram for illustrating an example of a leak-preventing identification mark and a template 80 for detecting the leak-preventing identification mark. In the figure, the concentric circles having a point P2 at the center thereof are referred to as rings 81, 82, 83 and 84 from the outside to the center, and the intersection points of the diameter of a ring 81 at 45 degrees to the main scanning direction A and the sub scanning direction B with the circumference are referred to as points P0 and P5 from top left to bottom right. When the intersection point of a segment P0P2 with the ring 83 is referred to as a point P1 and the intersection points of a segment P2P5 with the rings 84 and 82 are respectively referred to as points P3 and P4, an image formed of point patterns 85 (85a, 85a, 85a, 85a, 85a) positioned at the points P0 to P4 is referred to as a leak-preventing identification mark in the present embodiment. Assume that a plurality of such images having a combination of five points are included in each page of an original document of a classified document as a leak-preventing identification mark.

The template 80 will be described later.

Figure 13:
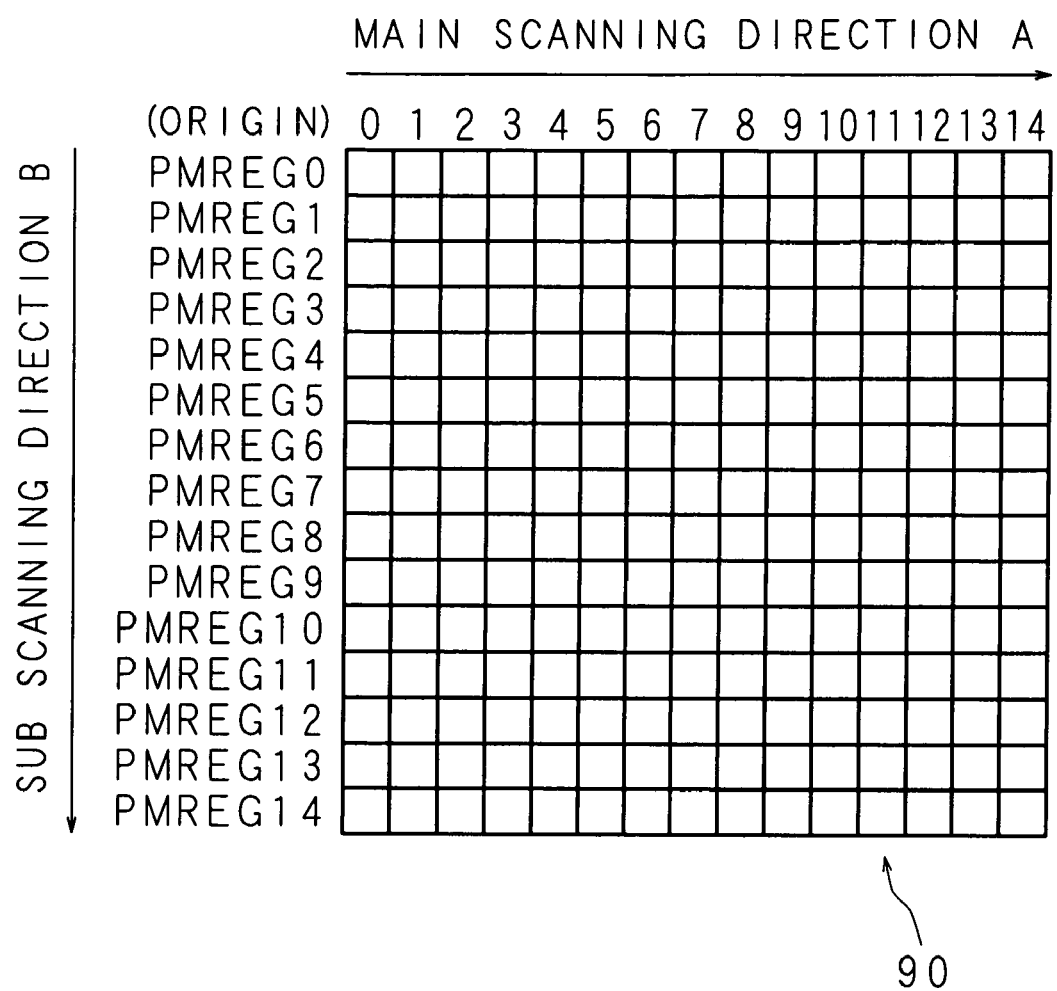
FIG. 13 is an explanatory diagram for illustrating the configuration of a template to be used by a leak-preventing identification mark detecting section for detecting a candidate of a leak-preventing identification mark.

FIG. 13 is an explanatory diagram for illustrating the configuration of a template 90 to be used by the leak-preventing identification mark detecting section 124 for detecting a candidate of a leak-preventing identification mark. The leak-preventing identification mark detecting section 124 in the present embodiment uses the rectangular template 90 having a size corresponding to 15 pixels and 15 lines respectively in the main scanning direction A and the sub scanning direction B to detect a candidate of the pattern 85 illustrated in FIG. 12. Hereinafter, assume that the origin is set at the position of the top-left pixel in the figure. The position on the template 90 is represented by a combination of an address (0 to 14) in the main scanning direction A and a line number (PMREG 0 to 14) in the sub scanning direction B (both are 0 at the origin).

A specific pattern (area) of the template 90 will be described later.

Figure 14:
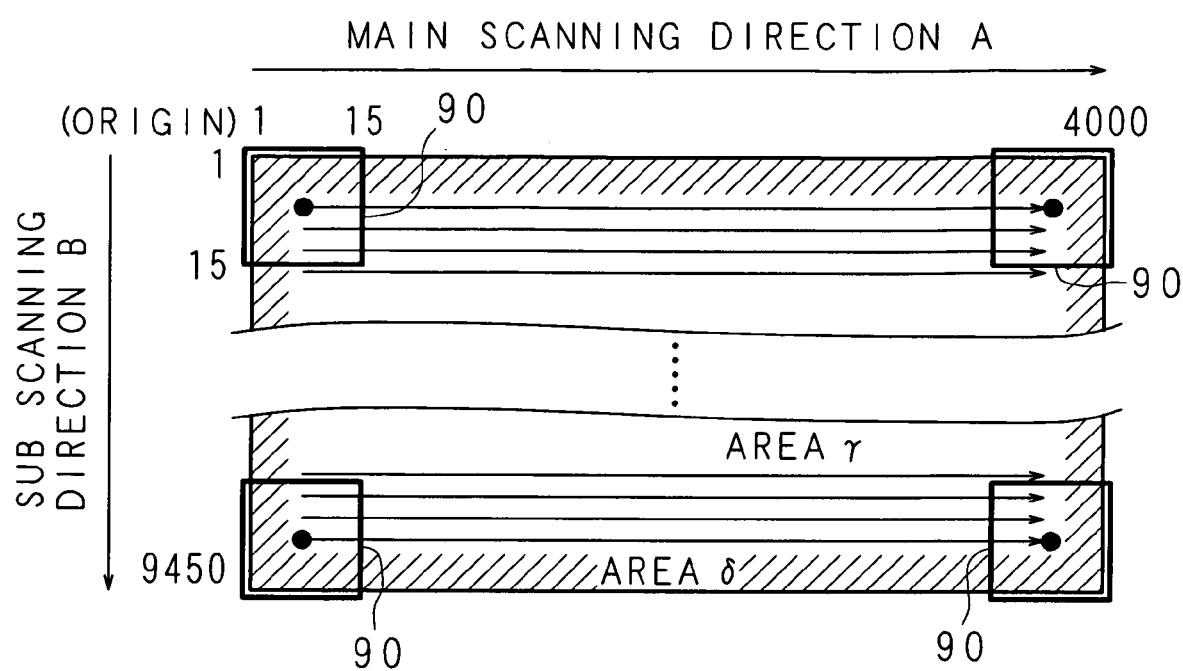
FIG. 14 is an explanatory diagram for illustrating the detection operation using template matching.

FIG. 14 is an explanatory diagram for illustrating the detection operation using template matching. In the figure, image data corresponding to one page is illustrated as an original document image having 4000 pixels in the main scanning direction A and 9450 lines in the sub scanning direction B arranged from the origin. For detecting a candidate of the pattern 85, the leak-preventing identification mark detecting section 124 performs template matching every time the entire template 90 is shifted by one pixel and one line respectively in the main scanning direction A and the sub scanning direction B from a state where the origin of the template 90 is set at the origin of the original document image. The template 90 is shifted "9450-15" times in all in the sub scanning direction B by alternately repeating "4000-15" times shift in the main scanning direction A and one time shift in the sub scanning direction B.

The area γ in FIG. 14 is an area where a candidate of the pattern 85 can possibly be detected, and the area δ is an area where a candidate of the pattern 85 cannot be detected.

FIGS. 15A, 15B, 15C, 15D and 15E are explanatory diagrams for illustrating a pattern (area) of the template 90 set for detecting a candidate of a leak-preventing identification mark. In the respective templates 90a, 90b, 90c, 90d and 90e illustrated in FIGS. 15A to 15E, a peripheral white judgment area, a peripheral count area, a first central count area, a second central count area and a third central count area are set. In the template matching to be performed by the leak-preventing identification mark detecting section 124, the number of black pixels having a pixel value of 1 in each area is counted and compared with a preset threshold so as to detect a candidate of a leak-preventing identification mark.

Figures 16A, 16B:
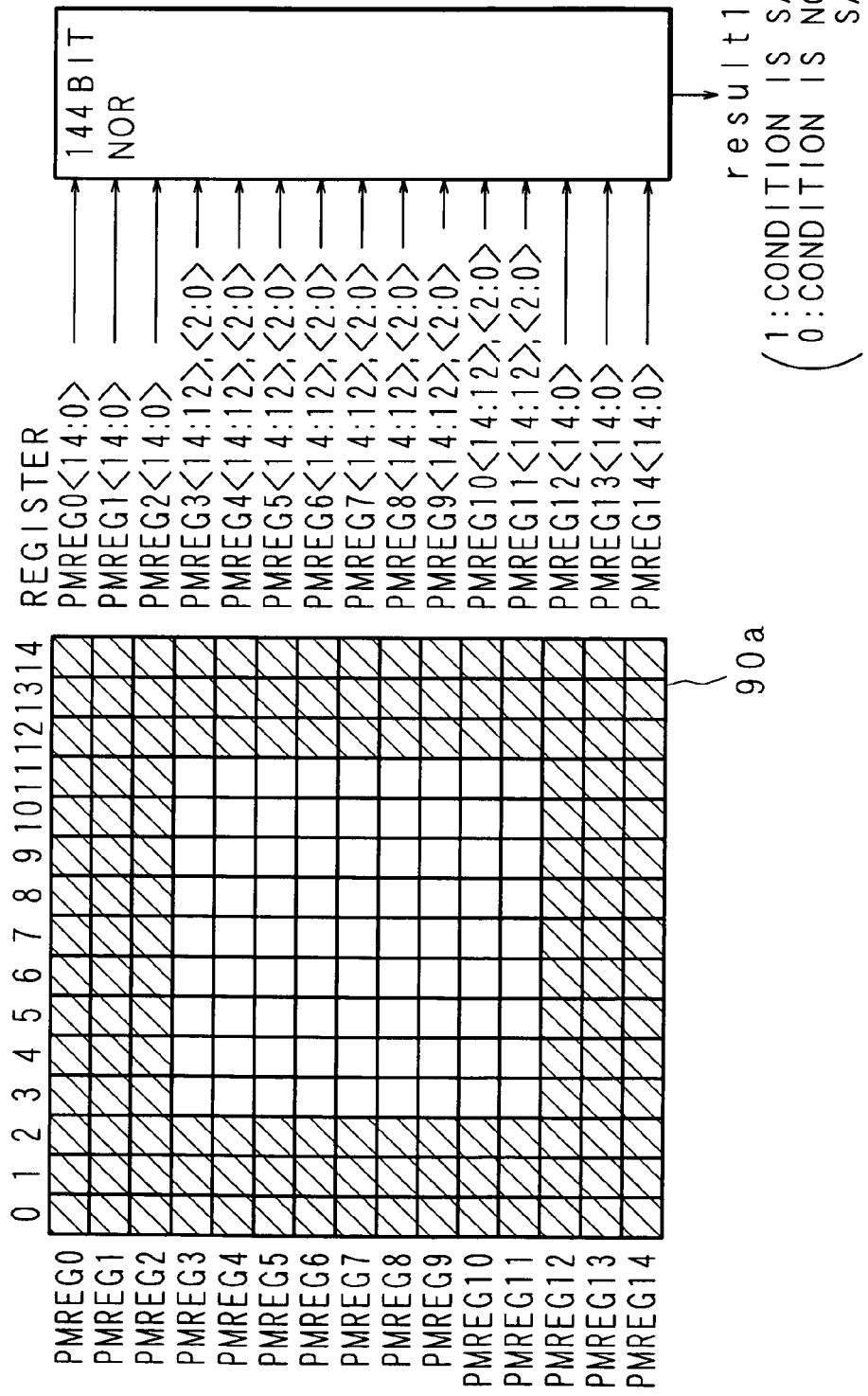
FIGS. 16A and 16B are explanatory diagrams for illustrating a peripheral white judgment area of a template and a configuration example for judgment using the template.

FIGS. 16A and 16B are explanatory diagrams for illustrating a peripheral white judgment area of the template 90a and a configuration example for judgment using the template 90a. The shaded area in FIG. 16A is a peripheral white judgment area. FIG. 16B illustrates a NOR circuit for executing the judgment and an expression representing a value to be inputted into the NOR circuit. For example, the expression of "PMREG 3<14:12>, <2:0>" represents a set of values (1 or 0) of pixels from the zeroth position to the second position and from the twelfth position to the fourteenth position among pixels on the third line of the template 90a (the same goes for the following). Since 144 bit values in all represented by the same expression are inputted into the NOR circuit, the output value of the NOR circuit becomes 1 when all of the input values are 0. That is, when the pixel value of the all pixels in the peripheral white judgment area is 0, the judgment result becomes 1 and a condition that the peripheral part is white is satisfied.

FIGS. 17A and 17B are explanatory diagrams for illustrating a peripheral count area of the template 90b and a configuration example for judgment using the template 90b. The shaded area in FIG. 17A is a peripheral count area. FIG. 17B illustrates a counter and a comparator for executing the judgment and an expression representing a value to be inputted into the counter. A set of values of 32 pixels in the peripheral count area is inputted into the counter, and the number of black pixels having a pixel value of 1, which is counted by the counter, and a value preset by a resistor are compared by the comparator. When the number of black pixels in the result is equal to or smaller than the set value, the judgment result becomes 1 and the condition is satisfied.

FIGS. 18A and 18B are explanatory diagrams for illustrating a first central count area of the template 90c and a configuration example for judgment using the template 90c. The shaded area in FIG. 18A is a first central count area. FIG. 18B illustrates a counter and a comparator for executing the judgment and an expression representing a value to be inputted into the counter. A set of values of 24 pixels in the first central count area is inputted into the counter, and the number of black pixels having a pixel value of 1, which is counted by the counter, and a value preset by a resistor are compared by the comparator. When the number of black pixels in the result is equal to or smaller than the set value, the judgment result becomes 1 and the condition is satisfied.

FIGS. 19A and 19B are explanatory diagrams for illustrating a second central count area of the template 90d and a configuration example for judgment using the template 90d. The shaded area in FIG. 19A is a second central count area. FIG. 19B illustrates a counter and a comparator for executing the judgment and an expression representing a value to be inputted into the counter. A set of values of 16 pixels in the second central count area is inputted into the counter, and the number of black pixels having a pixel value of 1, which is counted by the counter, and two different values (a set value "b" and a set value "c") preset by a resistor are compared by the comparator. When the number of black pixels in the result is between the two different set values (including the case where the number of back pixels is equal to any one of the setting values), the judgment result becomes 1 and the condition is satisfied.

FIGS. 20A and 20B are explanatory diagrams for illustrating a third central count area of the template 90e and a configuration example for judgment using the template 90e. The shaded area in FIG. 20A is a third central count area. FIG. 20B illustrates a counter and a comparator for executing the judgment and an expression representing a value to be inputted into the counter. A set of values of 9 pixels in the third central count area is inputted into the counter, and the number of black pixels having a pixel value of 1, which is counted by the counter, and a value preset by a resistor are compared by the comparator. When the number of black pixels in the result is equal to or larger than the set value, the judgment result becomes 1 and the condition is satisfied.

When all of the judgment conditions described with reference to FIGS. 16A to 20B are satisfied (when the NOR circuit and the four comparators output an output value of 1), the leak-preventing identification mark detecting section 124 judges that a candidate of a leak-preventing identification mark has been detected from the image data stored in the line memory 124a. When detecting a candidate of a leak-preventing identification mark, the leak-preventing identification mark detecting section 124 extracts image data having the origin positioned at the origin of the template 90 (90a, 90b, 90c, 90d and 90e) at this time from the image data stored in the line memory 124a and outputs the image data to the positional relation calculating section 125.

By the way, the template 80 to be used by the positional relation calculating section 125 for detecting the pattern 85 is obtained by setting the concentric rings 81, 82, 83 and 84 in a rectangular area having a size corresponding to 101 pixels and 101 lines respectively in the main scanning direction A and the sub scanning direction B (see FIG. 12). For performing template matching using the template 80 for the image data inputted from the leak-preventing identification mark detecting section 124, the positional relation calculating section 125 detects images (points), which accord with the rings 81, 83, 84 and 82 in the template 80, from the inputted image data and set the images (points) respectively as the points P0, P1, P3 and P4.

When all of the following conditions (a) to (d) are satisfied, the vector calculating section 125b sets the origin of an XY coordinate at the center of the template 80 so that the coordinates of the detected points P0, P1, P3 and P4 respectively become (X1, Y1), (X2, Y2), (X3, Y3) and (X4, Y4), and calculates the linearity of the points P0 to P4.

(a) The number of images (points) in an area corresponding to the template 80 is equal to or smaller than 6.
(b) An image to be the point P2 exists at the center of an area corresponding to the template 80.
(c) One image (point P0, P4, P1 or P3) exists in each ring 81, 82, 83 or 84.
(d) Images (points P0 and P1) on the rings 81 and 83 and images (points P3 and P4) on the rings 82 and 84 exist at opposite sides of the central point P2.

When the above conditions are satisfied, the vector calculating section 125b judges whether all of the conditions of the following expressions (1) to (3) are satisfied or not. When all of the conditions of the expressions (1) to (3) are satisfied, the vector calculating section 125b judges that the points P0 to P4 are arranged linearly and the pattern 85 has been detected.

Here, α1, α2 and α3 are preset constants.

$$|X1 \times Y2 - Y1 \times X2| < \alpha 1 \tag{1}$$

$$|X3 \times Y2 - Y3 \times X2| < \alpha 2 \tag{2}$$

$$|X1 \times Y4 - Y1 \times X4| < \alpha 3 \tag{3}$$

When the pattern 85 is detected by the vector calculating section 125b, the positional relation calculating section 125 notifies the similarity calculating section 127 of the fact that the pattern 85 has been detected. When receiving the notification from the positional relation calculating section 125, the similarity calculating section 127 increments the number of mark pairs held therein. When the incremented number of mark pairs becomes equal to or larger than a predetermined threshold, the similarity calculating section 127 notifies the PCU 23 of detection of a leak-preventing identification mark (which will be hereinafter referred to as Detection 2).

The following description will explain the operation of the digital multi-function peripheral 2 described above, using a flow chart.

Figure 21A:
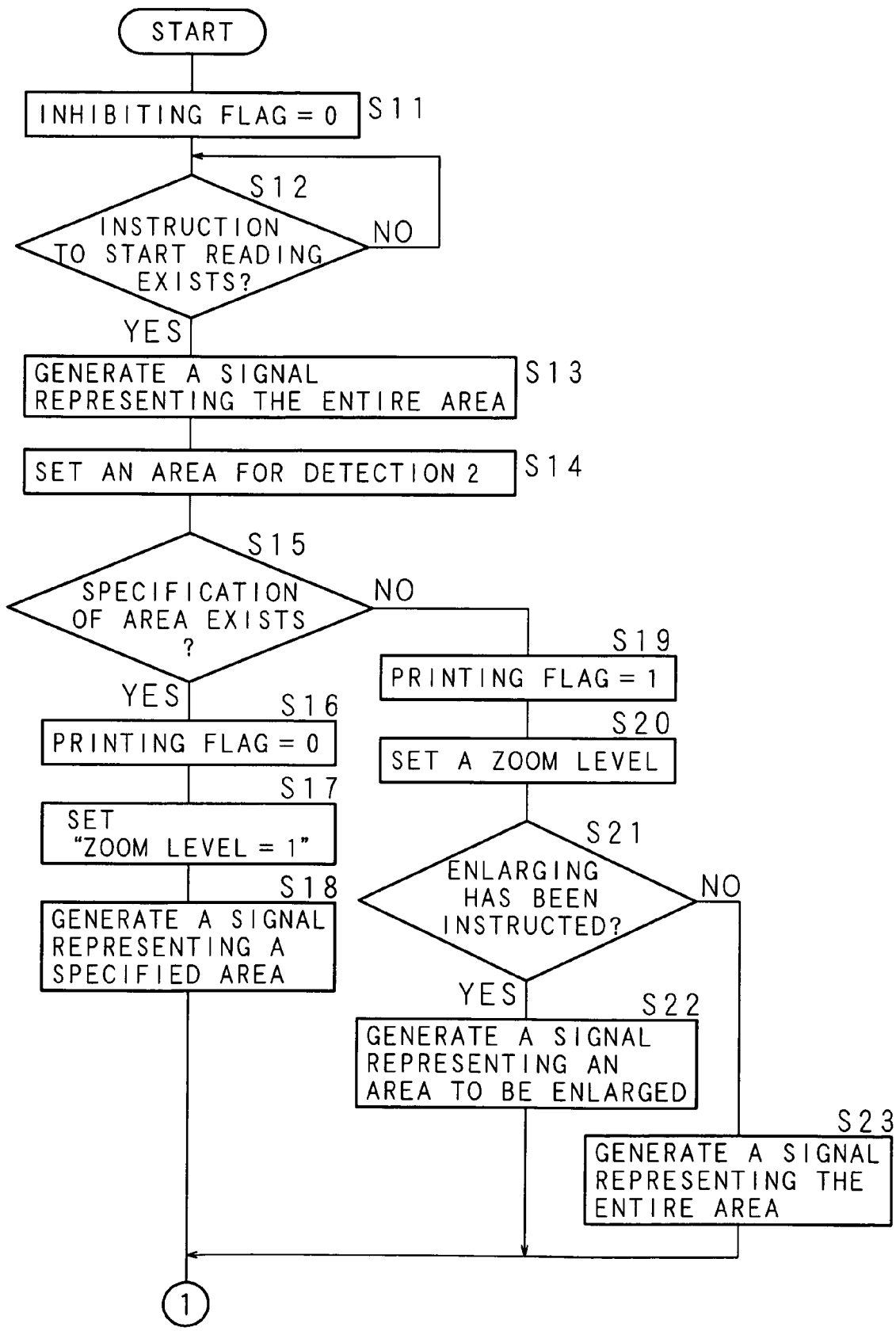
FIGS. 21A, 21B and 21C are flow charts for illustrating the process procedure of a CPU in the case where copying of an original document is instructed and an area is specified.
Figure 21B:
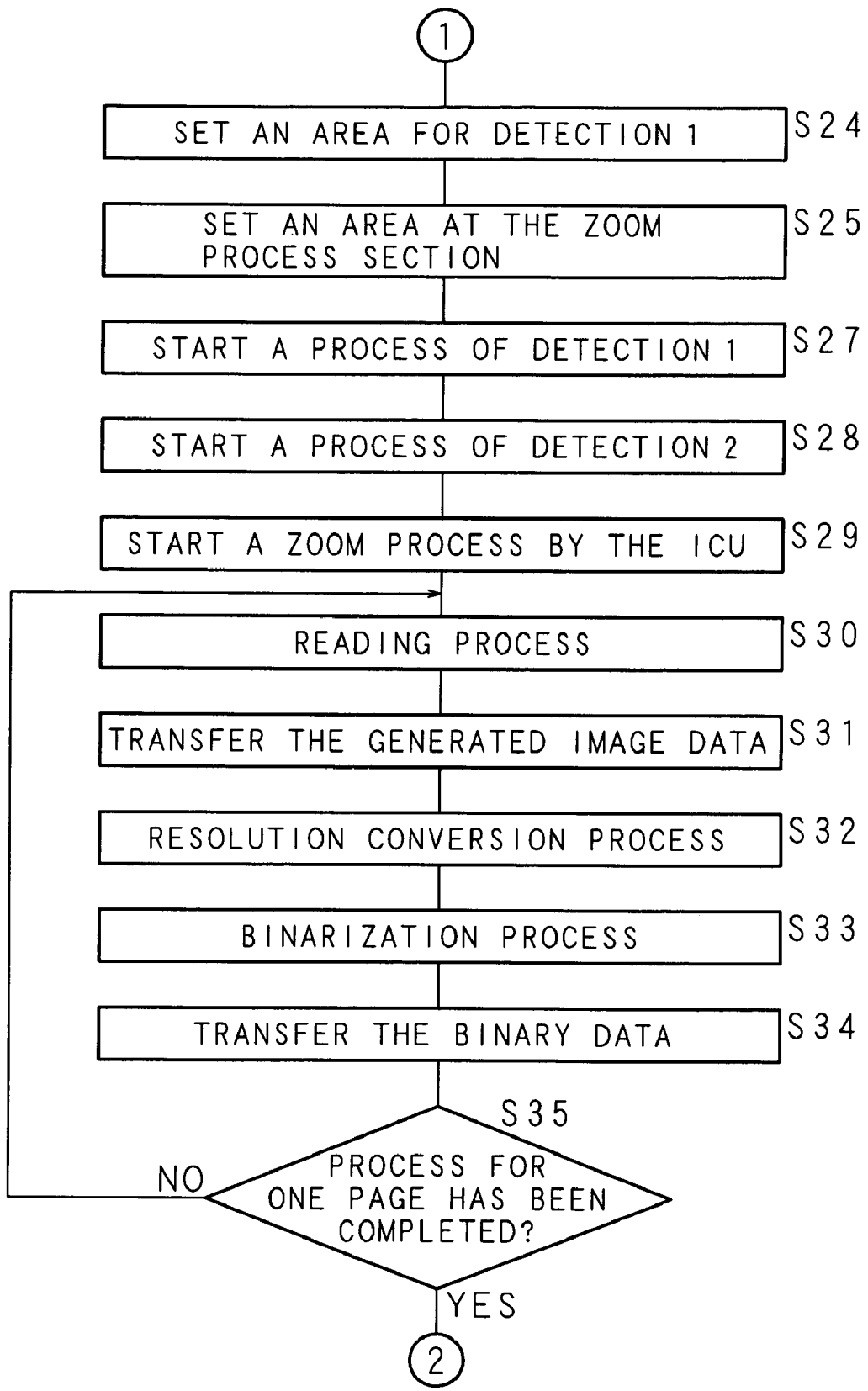
Figure 21C:
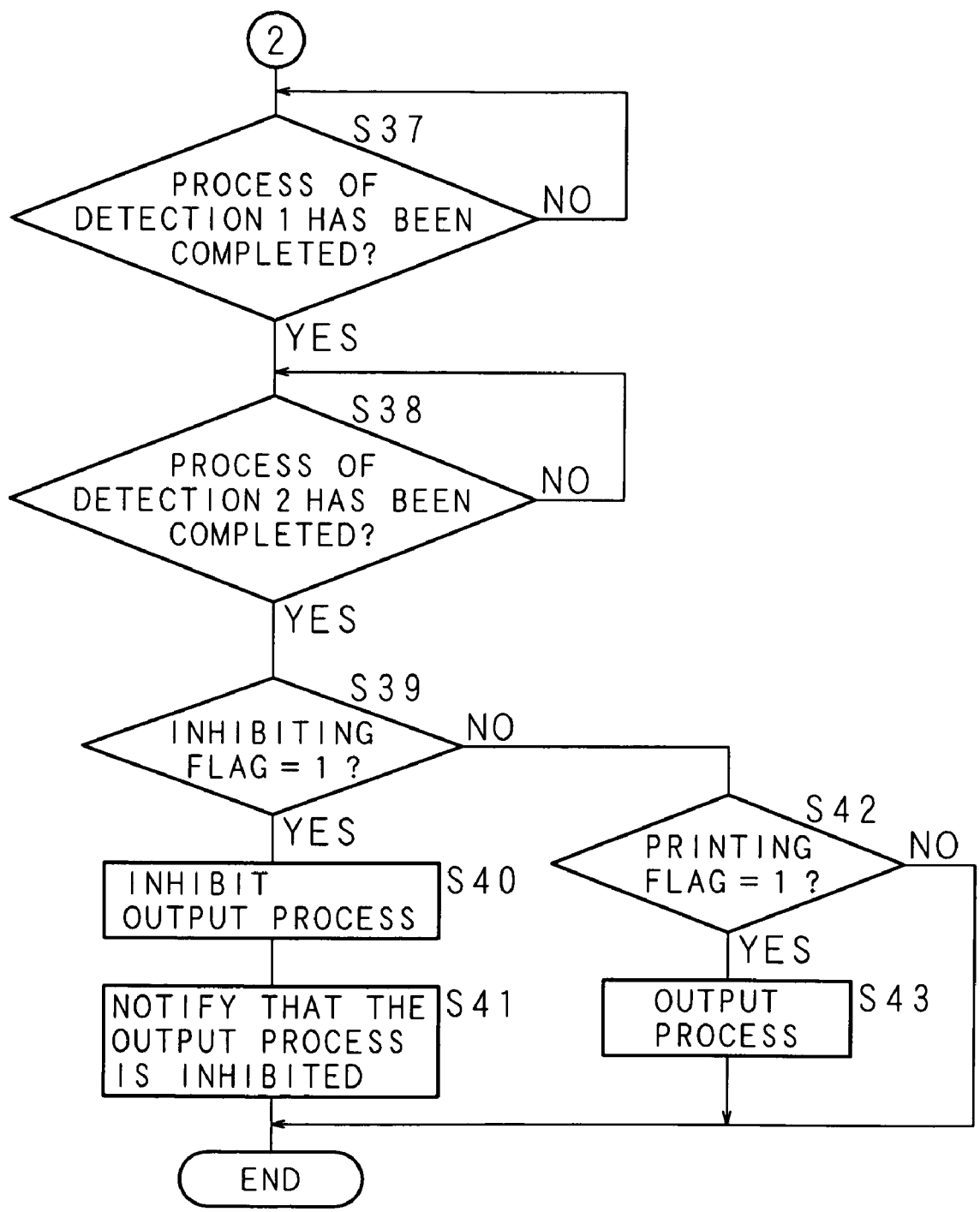

FIGS. 21A, 21B and 21C are flow charts for illustrating the process procedure of the CPU 231 in the case where copying of an original document is instructed and an area is specified. The process in FIGS. 21A to 21C is started when each page of an original document becomes readable, and is executed in accordance with a control program prestored in the ROM 232.

An inhibiting flag for representing inhibition of output and a printing flag for representing existence of an instruction for print output are stored in the RAM 233. In the inhibiting flag, 1 represents output inhibition while 0 represents output permission. In the printing flag, 1 represents existence of an instruction while 0 indicates nonexistence of an instruction.

When the process in FIGS. 21A to 21C is started, the CPU 231 once clears the inhibiting flag to 0 (S11) and judges whether an instruction to start reading, which is inputted from the operation section 21b, exists or not (S12). When judging that an instruction to start reading does not exist (S12: NO), the CPU 231 waits until an instruction to start reading is given. When judging that an instruction to start reading exists (S12: YES), the CPU 231 controls the area generating section 121 of the image judgment section 12 to generate a signal representing the entire area of an original document to be read (S13) and outputs the generated signal to the judgment area deciding section 122 to set an area for Detection 2 (S14). In such a manner, image data included in the entire area of an original document is inputted into the leak-preventing identification mark detecting section 124.

The PCU 231 then judges whether a specification of an area, which is inputted from the operation section 21b, exists or not (S15). When judging that a specification of an area exists (S15: YES), the CPU 231 clears the printing flag to 0 so as to indicate that an instruction for print output does not exist (S16). The CPU 231 sets zoom level=1" for the zoom process section 221 of the ICU 22 (S17) and controls the area generating section 121 of the image judgment section 12 to generates a signal representing the region of a specified area (S18).

When judging at the step S15 that a specification of an area does not exist (S15: NO), the CPU 231 sets the printing flag to 1 so as to indicate that an instruction for print output exists (S19). The CPU 231 sets a zoom level specified in the instruction to start reading at the zoom process section 221 of the ICU 22 (S20) and judges whether enlarging has been instructed in the instruction to start reading or not (S21). When judging that enlarging has been instructed (S21: YES), the CPU 231 controls the area generating section 121 to generate a signal representing the region of an area to be enlarged (S22). When judging that enlarging has not been instructed (S21: NO), the CPU 231 controls the area generating section 121 to generate a signal representing the entire area of an original document to be read (S23).

After the process at the step S18, S22 or S23 is completed, the CPU 231 outputs a signal generated at each step to the judgment area deciding section 123 to set an area for Detection 1 (S24) and sets an area represented by the signal at the zoom process section 221 (S25). In such a manner, image data included in any one of a specified area in an original document, an area to be enlarged in an original document and the entire area of the original document is inputted into the forgery-preventing identification mark detecting section 126 (line memory 126a) and the zoom process section 221 (line memory 221a).

The CPU 231 then starts a process related to Detection 1 (i.e., forgery-preventing identification mark detection) (S27), starts a process related to Detection 2 (i.e., leak-preventing identification mark detection) (S28), and further starts a zoom process by the ICU 22 (S29).

The CPU 231 then controls the image reading section 21 to execute a document reading process (S30). Specifically, the CPU 231 reads the entire area of an original document placed on the document stage 21a and generates RGB image data. The CPU 231 then transfers the generated image data to the ICU 22 (S31) and controls the resolution converting section 111 of the preprocess section 11 to execute a resolution conversion process (S32) and convert the resolution of the image data into a low resolution of 100 dpi or 200 dpi. Furthermore, the CPU 231 controls the color filters 112 and 113 respectively to execute binarization process (S33) and convert the image data having a low resolution respectively into binary data.

The CPU 231 then transfers the respective binary data obtained respectively by the conversion with the color filters 112 and 113 to the judgment area deciding section 122, 123 (S34). In such a manner, the respective binary data are respectively stored in the line memory 124a and the line memory 126a via the leak-preventing identification mark detecting section 124 and the forgery-preventing identification mark detecting section 126. The CPU 231 then judges whether a process for image data of one page has been completed or not (S35) and, when judging that the process has not been completed (S35: NO), returns the process to the step S30.

When judging that the process for image data of one page has been completed (S35: YES), the CPU 231 judges whether a process related to Detection 1 has been completed or not (S37) and, when judging that the process has not been completed (S37: NO), waits until the process is completed. When judging that the process has been completed (S37: YES), the CPU 231 judges whether a process related to Detection 2 has been completed or not (S38) and, when judging that the process has not been completed (S38: NO), waits until the process is completed. In such a manner, the CPU 231 waits until detection of a forgery-preventing identification mark and a leak-preventing identification mark is completed for a predetermined range of image data of one page.

When judging that the process related to Detection 2 has been completed (S38: YES), the CPU 231 judges whether the inhibiting flag is set to 1 or not (S39). When judging that the inhibiting flag is set to 1 (S39: YES), the CPU 231 inhibits output process (i.e., formation of an image on a sheet or storage of image data in the image memory 223) (S40) and notifies the user of the fact that the output process is inhibited (S41).

Specifically, for inhibiting output process, the CPU 231 controls the image forming section 24 not to form an output image on the basis of the image data inputted from the ICU 22 and erases the image data stored in the image memory 223. Moreover, for giving a notice of inhibition of output process, the CPU 231 displays a predetermined message on a display of the operation section 21b.

When judging at the step S39 that the inhibiting flag is not set to 1 (S39: NO), the CPU 231 judges whether the printing flag is set to 1 or not (S42). When judging that the printing flag is not set to 1 (S42: NO), the CPU 231 terminates the process. When judging that the printing flag is set to 1 (S42: YES), the CPU 231 controls the image forming section 24 to execute output process on the basis of the image data stored in the image memory 223 (S43) and terminates the process.

Figure 22:
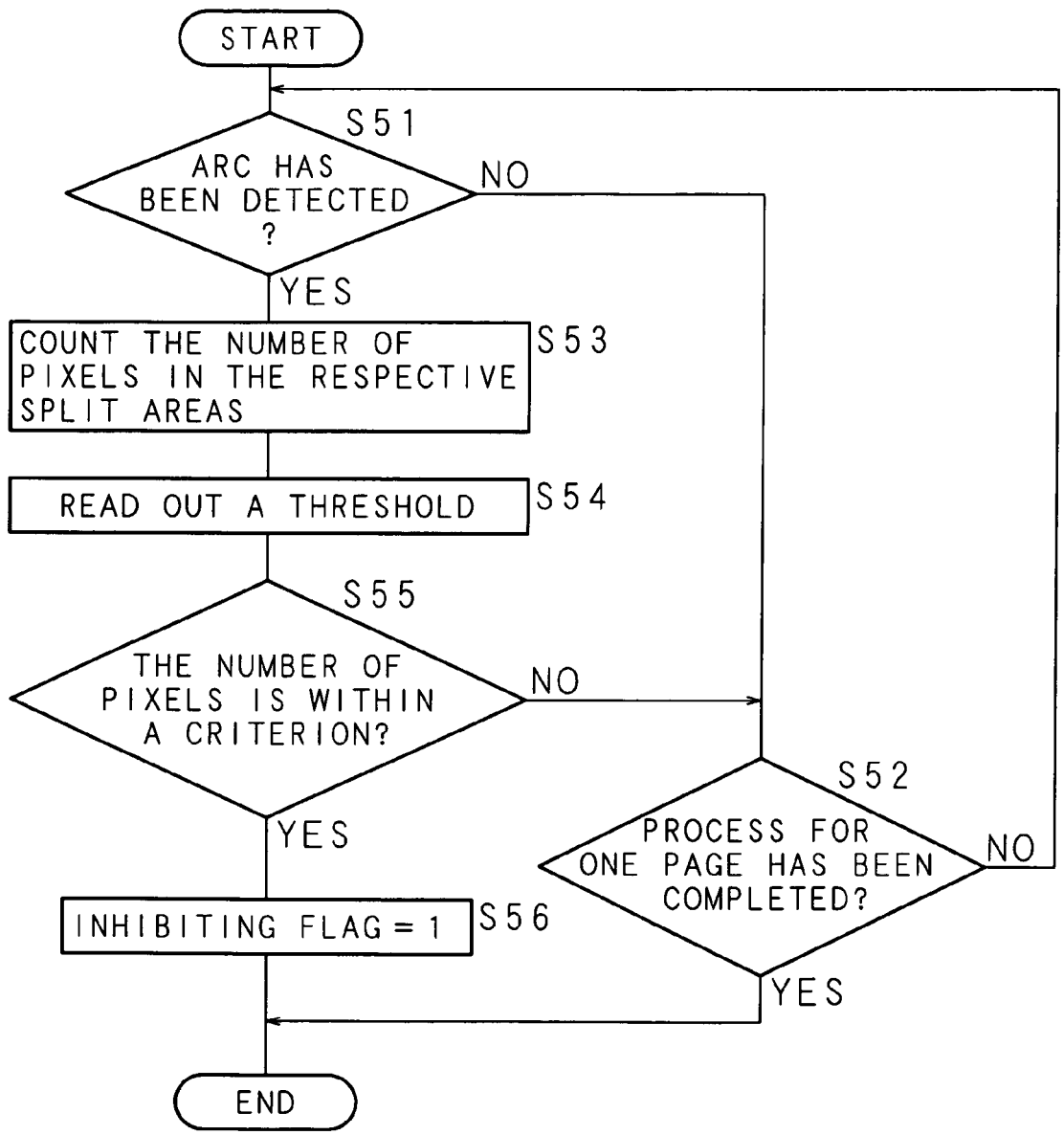
FIG. 22 is a flow chart for illustrating the process procedure of the CPU related to Detection 1.

FIG. 22 is a flow chart for illustrating the process procedure of the CPU 231 related to Detection 1. The process in FIG. 22 is started from the process at the step S27 in FIG. 21B and is executed for image data stored in the line memory 126a when the CPU 231 controls the forgery-preventing identification mark detecting section 126 of the image judgment section 12.

When the process in FIG. 22 is started, the CPU 231 controls the forgery-preventing identification mark detecting section 126 to perform the process described with reference to FIGS. 8 to 10. Specifically, the CPU 231 first judges whether the arc 42a having a predetermined curvature radius has been detected from image data stored in the line memory 126a or not (S51). When judging that the arc 42a has not been detected (S51: NO), the CPU 231 judges whether a process for a given range in one page has been completed or not (S52) and, when judging that the process has not been completed (S52: NO), returns the process to the step S51. When judging that the process has been completed (S52: YES), the CPU 231 terminates the process of Detection 1 without detecting the pattern 40.

When judging that the arc 42a has been detected (S51: YES), the CPU 231 counts the number of pixels included in the respective split areas 71 to 74 in the judgment area 70 surrounded by the circle 42 including the detected arc 42a (S53). The CPU 231 then reads out a threshold illustrated in FIG. 11B from the threshold data storing section 126b (S54)

and judges whether the number of pixels included in each of the split areas 71 to 74 is within a criterion in FIG. 11B or not (S55).

When judging that the number of pixels is not within a criterion (S55: NO), the CPU 231 shifts the process to the step S52. When judging that the number of pixels is within a criterion (S55: YES), the CPU 231 judges that a pattern 40 has been detected, sets the inhibiting flag to 1 (S56), and terminates the process of Detection 1.

Figure 23:
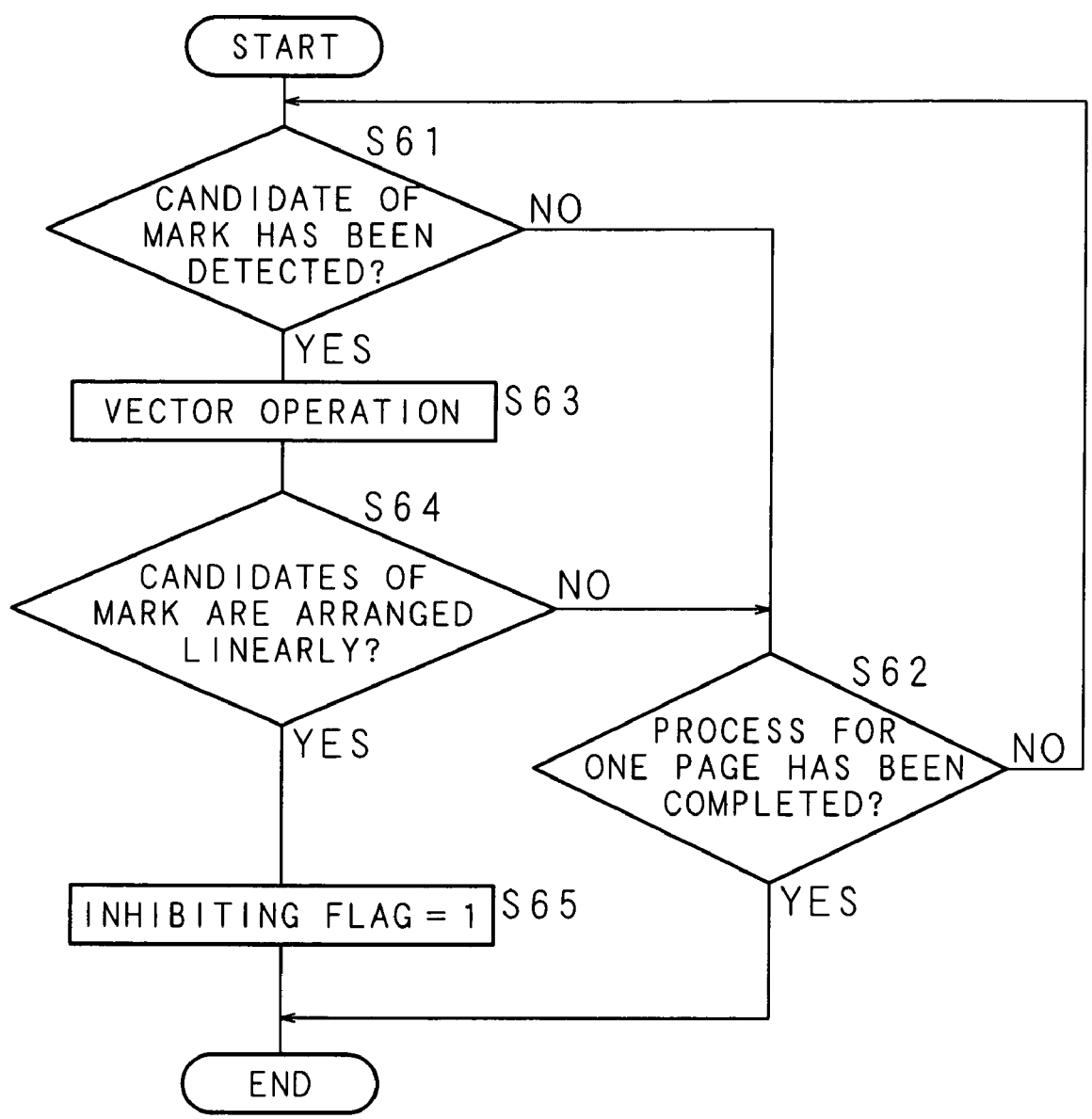
FIG. 23 is a flow chart for illustrating the process procedure of the CPU related to Detection 2.

FIG. 23 is a flow chart for illustrating the process procedure of the CPU 231 related to Detection 2. The process in FIG. 23 is started from the process at the step S28 in FIG. 21B and is executed for image data stored in the line memory 124a when the CPU 231 controls the leak-preventing identification mark detecting section 124 and the positional relation calculating section 125 of the image judgment section 12.

When the process in FIG. 23 is started, the CPU 231 controls the leak-preventing identification mark detecting section 124 to perform the process described with reference to FIGS. 13 to 20B. Specifically, the CPU 231 first judges whether a candidate of a leak-preventing identification mark has been detected from image data stored in the line memory 124a or not (S61). When judging that a candidate has not been detected (S61: NO), the CPU 231 judges whether a process for a given region of one page has been completed or not (S62) and, when judging that the process has not been completed (S62: NO), returns the process to the step S61. When judging that the process has been completed (S62: YES), the CPU 231 terminates the process of Detection 2 without detecting the pattern 85.

When judging that a candidate of a leak-preventing identification mark has been detected (S61: YES), the CPU 231 controls the positional relation calculating section 125 to judge whether conditions (conditions (a) to (d)) are satisfied in calculation of the linearity of the candidate of a leak-preventing identification mark or not. When judging that the conditions are satisfied, the CPU 231 performs vector operation represented by the expressions (1) to (3) by the vector calculating section 125b (S63). The CPU 231 judges whether candidates of a leak-preventing identification mark are arranged linearly or not on the basis of the result of the vector operation (S64).

When judging that the candidates are not arranged linearly (S64: NO), the CPU 231 shifts the process to the step S62. When judging that the candidates are arranged linearly (S64: YES), the CPU 231 judges that the pattern 85 has been detected, sets the inhibiting flag to 1 (S65), and terminates the process of Detection 2.

Figure 24:
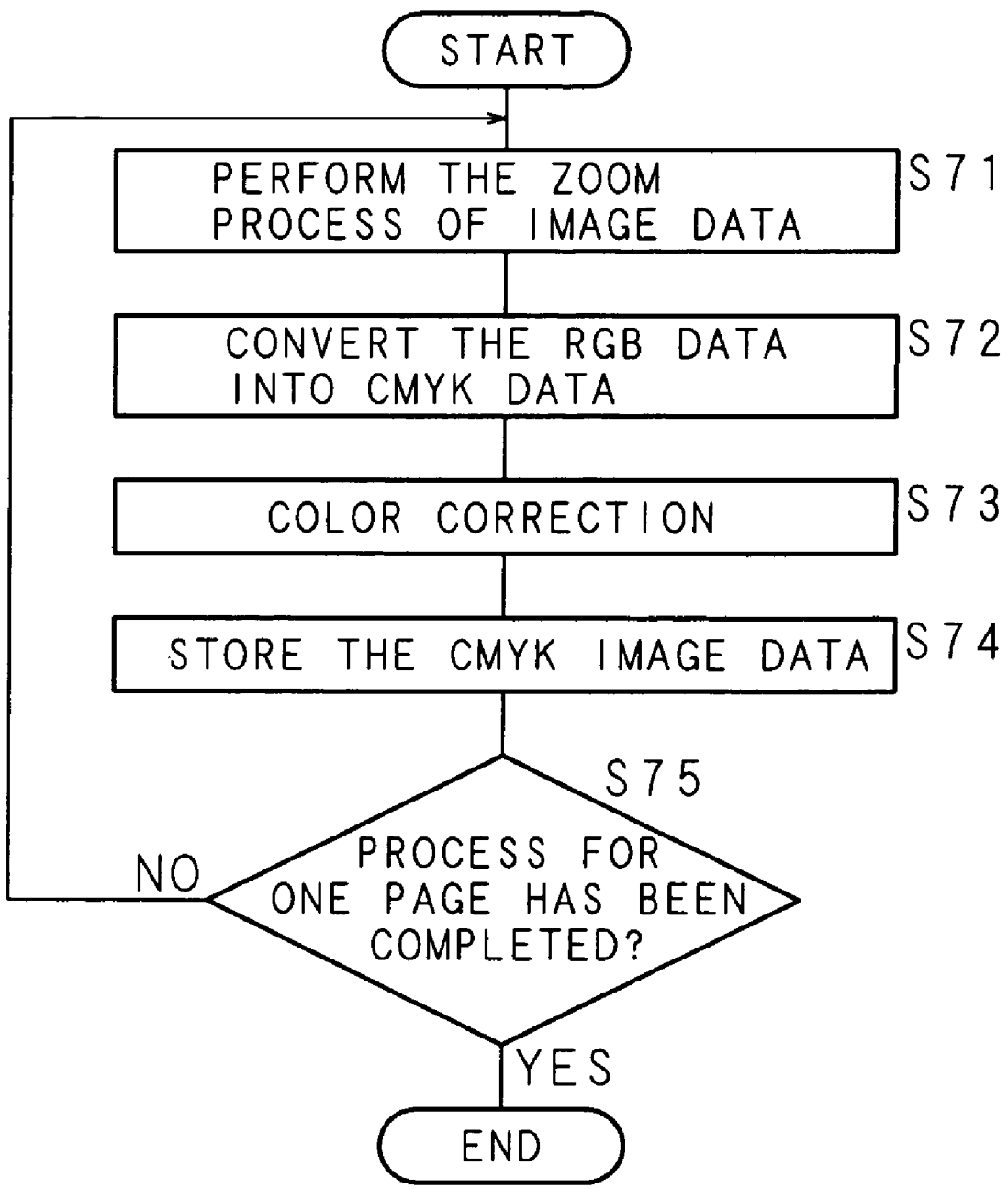
FIG. 24 is a flow chart for illustrating the process procedure of the CPU related to zoom process at the ICU.

FIG. 24 is a flow chart for illustrating the process procedure of the CPU 231 related to zoom process at the ICU 22. The process in FIG. 24 is started from the process at the step S29 in FIG. 21B and is executed for image data stored in the line memory 221a when the CPU 231 controls the ICU 22.

When the process in FIG. 24 is started, the CPU 231 performs the zoom process of RGB image data stored in the line memory 221a to a set zoom level (S71) and converts the RGB image data obtained by the zoom process into CMYK image data (S72). The CPU 231 then performs color correction for the CMYK image data obtained by the conversion (S73) and stores the CMYK image data in the image memory 223 (S74).

The CPU 231 then judges whether a process for a given region of one page has been completed or not (S75) and, when judging that the process has not been completed (S75: NO), returns the process to the step S71. When judging that the process has been completed (S75: YES), the CPU 231 terminates the zoom process.

As described above, when an image based on accepted image data is to be enlarged with the present embodiment, whether patterns representing a leak-preventing identification mark and a forgery-preventing identification mark are respectively included in an area sufficiently larger than an area to be enlarged and in an area having a size substantially equal to that of the area to be enlarged in the image before enlarging or not is determined.

In such a manner, it is possible to prevent false negative of a leak-preventing identification mark and therefore it is possible to prevent information leak even when an original document image is to be enlarged. Moreover, it is possible to prevent false positive of a copy-inhibited original document image since detection of a forgery-preventing identification mark, which is not indispensable, is omitted. For example, it is possible to prevent false detection of the fact that copying is inhibited, for an original document image, copying of which needs not to be inhibited actually.

Moreover, whether patterns representing a leak-preventing identification mark and a forgery-preventing identification mark are respectively included in the entire area of an image based on accepted image data and in an area to be enlarged or not is determined.

Accordingly, it becomes possible to detect a target pattern from an area necessary and sufficient for detection.

Furthermore, whether patterns representing a leak-preventing identification mark and a forgery-preventing identification mark are respectively included in the entire area and in a specified area, in an image based on accepted image data or not is determined.

Accordingly, it becomes possible to detect a target pattern from an area necessary and sufficient for detection.

Furthermore, only image data belonging to a specified area is stored in an image memory.

Accordingly, it becomes possible to reduce the capacity of an image memory to be used for storing image data for subsequent processes.

Furthermore, an output image is formed on the basis of an image, for which the image processing device has determined that patterns representing a leak-preventing identification mark and a forgery-preventing identification mark are respectively not included in two areas having different sizes.

Accordingly, it becomes possible to apply an image processing device, which can prevent information leak and false positive of a copy-inhibited original document image, to an image forming device.

The present invention is not limited to the present embodiment wherein whether the patterns 40 and 85 are included in image data read from an original document by the image reading section 21 or not is determined. For example, whether the patterns 40 and 85 are included in image data acquired from the digital camera 31, the PC 32 and the notebook PC 33 through the network 30 or not may be determined.

Moreover, the present invention is not limited to the present embodiment wherein enlarging is instructed and an area is set in the instruction to start reading as illustrated in the flow chart. For example, an instruction for enlarging and specification of an area may be accepted after the image processing device accepts image data.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image forming device comprising:

a section that accepts image data including a plurality of pixel data;

a detecting section that detects, when an image based on the accepted image data is to be enlarged at a specific zoom level, whether a pattern, distinct from the image, indicating that unauthorized use of the image is inhibited is included at any place in an entire area of the image or not, and detects whether a pattern, distinct from the image, indicating that copying of the image is inhibited is included in an area to be enlarged in the image or not; and an image forming section that forms an output image based on an image, for which the detecting section has detected that the patterns are not included separately in the entire area of the image and the area to be enlarged, and does not perform an output process according to an image, for which the detecting section has detected that the pattern indicating that unauthorized use of the image is inhibited is included in the entire area of the image and the detecting section has detected that the pattern indicating that copying of the image is inhibited is included in the area to be enlarged.

2. An image forming device comprising:

a section that accepts image data including a plurality of pixel data;

an accepting section that accepts specification of an area in an area in an image based on the accepted image data;

a detecting section that detects whether a pattern, distinct from the image, indicating that unauthorized use of the image is inhibited is included at any place in an entire area of the image or not, and detects whether a pattern, distinct from the image, indicating that copying of the image is inhibited is included in an area whose specification has been accepted by the accepting section or not; and an image forming section that forms an output image based on an image, for which the detecting section has detected that the patterns are not included separately in the entire area of the image and the area whose specification has been accepted by the accepting section, and does not perform an output process according to an image, for which the detecting section has detected that the pattern indicating that unauthorized use of the image is inhibited is included in the entire area of the image and the detecting section has detected that the pattern indicating that copying of the image is inhibited is included in the area whose specification has been accepted by the accepting section.

3. The image forming device according to claim 2, comprising a storing section for storing image data belonging to the area.

* * * * *